(12) United States Patent
Strandzhev et al.

(10) Patent No.: US 10,225,142 B2
(45) Date of Patent: Mar. 5, 2019

(54) METHOD AND SYSTEM FOR COMMUNICATION BETWEEN A MANAGEMENT-SERVER AND REMOTE HOST SYSTEMS

(71) Applicant: VMware, Inc., Palo Alto, CA (US)

(72) Inventors: Ivaylo Petkov Strandzhev, Sofia (BG); Danail Grigorov, Sofia (BG); Asen Alexandrov, Sofia (BG); Ilko Dragoev, Sofia (BG)

(73) Assignee: VMware, Inc., Palo Alto, CA (US)

( * ) Notice: Subject to any disclaimer, the term of this patent is extended or adjusted under 35 U.S.C. 154(b) by 560 days.

(21) Appl. No.: 14/788,157

(22) Filed: Jun. 30, 2015

(65) Prior Publication Data

US 2017/0005861 A1    Jan. 5, 2017

(51) Int. Cl.
*G06F 15/16* (2006.01)
*H04L 12/24* (2006.01)
*H04L 29/08* (2006.01)

(52) U.S. Cl.
CPC ...... *H04L 41/0813* (2013.01); *H04L 41/0856* (2013.01); *H04L 41/0889* (2013.01); *H04L 67/28* (2013.01)

(58) Field of Classification Search
CPC . G06F 9/45558; G06F 9/45533; H04L 67/10; H04L 12/4641; H04L 67/1097
USPC .......................................................... 709/219
See application file for complete search history.

(56) References Cited

U.S. PATENT DOCUMENTS

| | | | | |
|---|---|---|---|---|
| 2010/0260173 A1* | 10/2010 | Johnson | ............ | H04M 3/42246 370/356 |
| 2011/0022812 A1* | 1/2011 | van der Linden | .... | G06F 9/5077 711/163 |
| 2011/0317703 A1* | 12/2011 | Dunbar | ................. | H04L 12/462 370/392 |
| 2012/0246642 A1* | 9/2012 | Pafumi | ..................... | G06F 8/63 718/1 |
| 2014/0282510 A1* | 9/2014 | Anderson | ........... | G06F 9/45558 718/1 |

* cited by examiner

*Primary Examiner* — Tauqir Hussain

(57) ABSTRACT

The current document is directed to methods and systems for exchange of information between management servers and remote host systems managed by the management server. In disclosed implementations, a local proxy server associated with the management server and a remote proxy server associated with the remote host systems both locally store configuration data for the host systems and exchange configuration differences through a wide area network in order to synchronize the stored configuration data between the proxy servers. Requests generated by the management server for host configuration data are satisfied by the local proxy server and configuration-data synchronization efficiently employs exchanges of configuration-data differences, rather than repeated transmission of all or large portions of the configuration data.

23 Claims, 45 Drawing Sheets

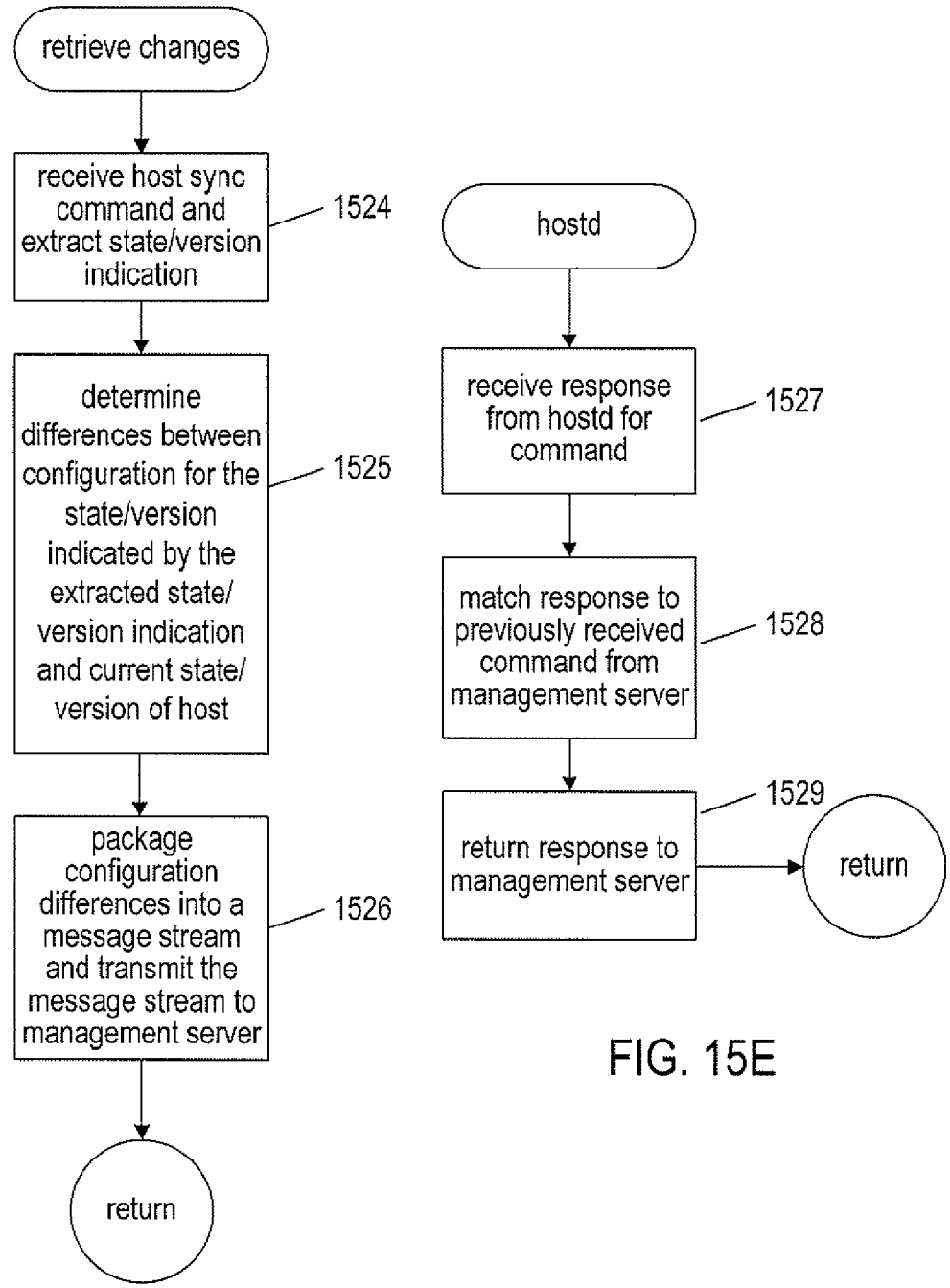

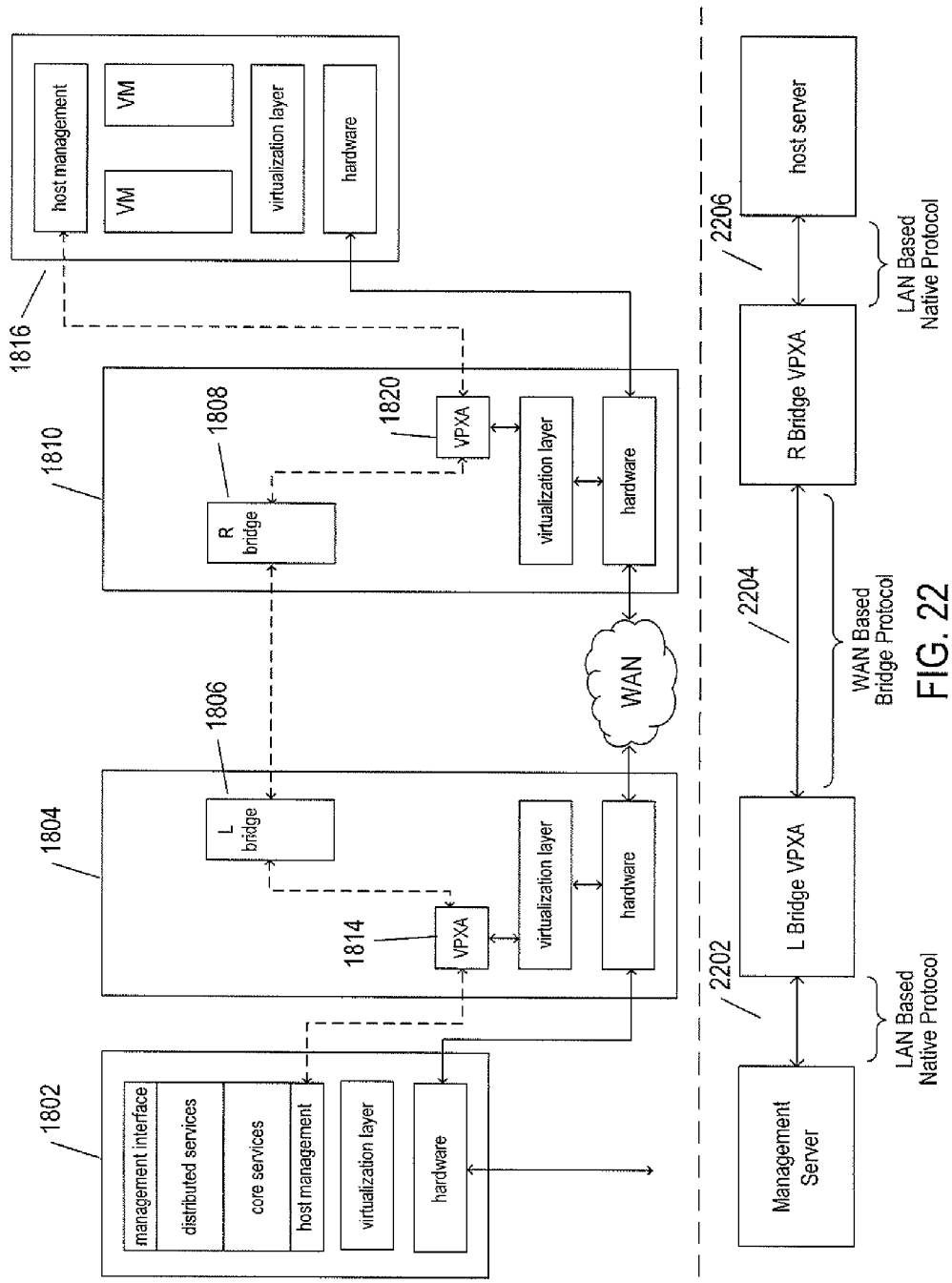

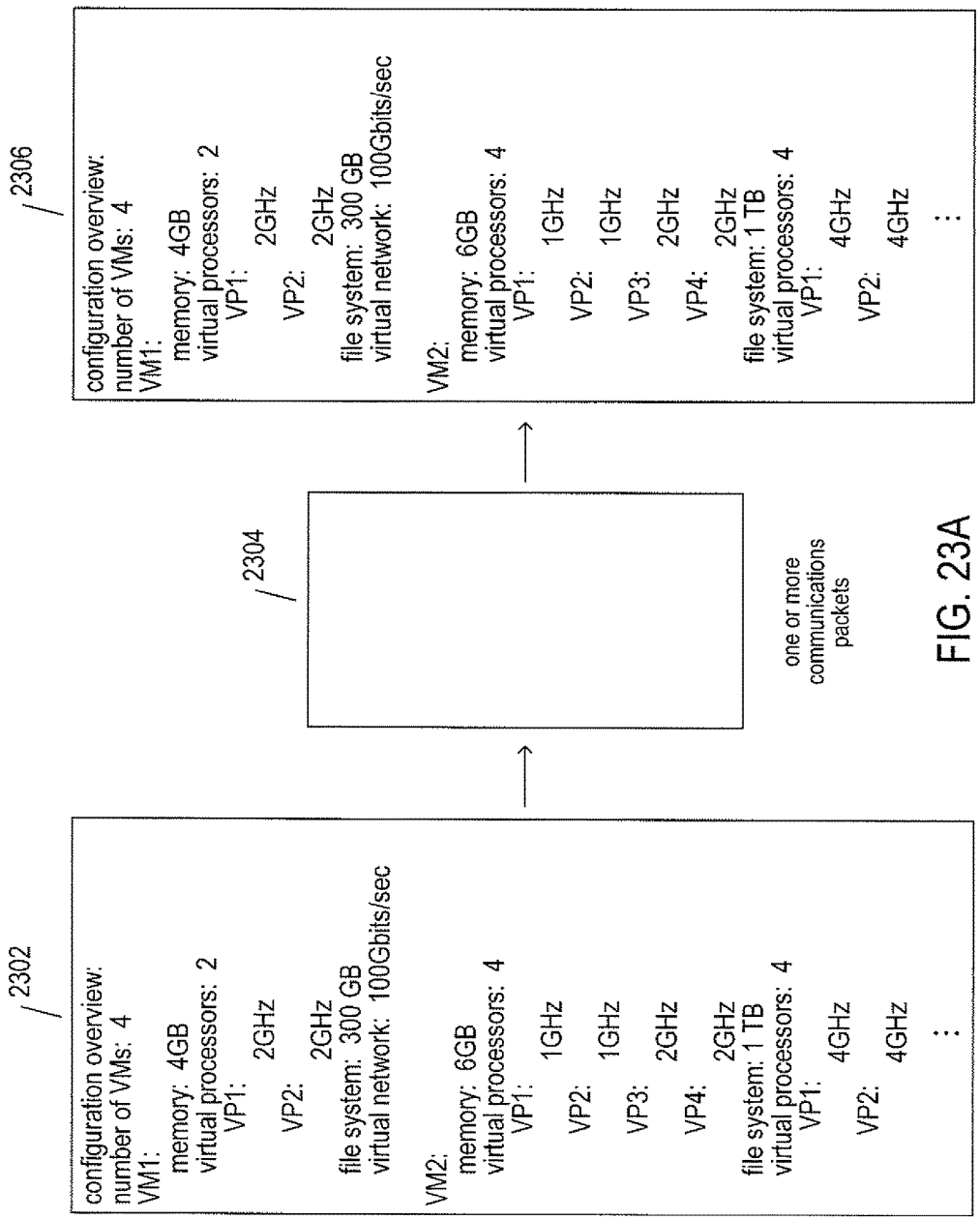

METHOD AND SYSTEM FOR COMMUNICATION BETWEEN A MANAGEMENT-SERVER AND REMOTE HOST SYSTEMS

TECHNICAL FIELD

The current document is directed to aggregation of computers into distributed computing systems and, in particular, to methods and systems for efficient communications between management servers and remote host systems using a wide area network.

BACKGROUND

Early computer systems were monolithic, single-processor systems that executed only a single task at each point in time. The early computer systems lacked operating systems and basic programming facilities such as assemblers and compilers. During the first several decades of the computer revolution, many of the basic single-system components of computer systems were developed and evolved to produce capable, operating-system-controlled, multi-tasking computer systems. For another decade, rapid evolution of processor technology, data-storage technologies, memory, and communications technologies led to dramatic increases in the capabilities and capacities of single-processor computer systems. Ultimately, however, in order to achieve even greater capabilities and capacities, computer-system designers turned to multi-processor systems and then to more complex, distributed computing systems comprising aggregations of many intercommunicating computer systems. This turn towards distributed computing was facilitated by the development of distributed locking methods for controlling access to distributed computing resources, distributed operating systems, and high-bandwidth electronic communications. During the past few decades, extremely large cloud-computing facilities have been developed and commercialized to the point that computational bandwidth and data-storage capacity are provided to customers of large cloud-computing providers much as electrical power and water are provided to customers of utility companies. Cloud-computing facilities often employ hundreds, thousands, or more networked and often geographically distributed multi-processor servers that are controlled, by virtualization technology, to produce hierarchical layers of virtualized computing facilities.

Virtual data centers and other virtual data structures are generally implemented on large physical distributed computing systems, including computing systems that employ a management sever to manage a large number of remote host systems. When communication between a management server and remote host systems involves wide area networks, communications bottlenecks may arise. Designers and developers of distributed computer systems continue to seek methods and systems for efficient management-server/remote-host information exchange.

SUMMARY

The current document is directed to methods and systems for exchange of information between management servers and remote host systems managed by the management server. In disclosed implementations, a local proxy server associated with the management server and a remote proxy server associated with the remote host systems both locally store configuration data for the host systems and exchange configuration differences through a wide area network in order to synchronize the stored configuration data between the proxy servers. Requests generated by the management server for host configuration data are satisfied by the local proxy server and configuration-data synchronization efficiently employs exchanges of configuration-data differences, rather than repeated transmission of all or large portions of the configuration data.

BRIEF DESCRIPTION OF THE DRAWINGS

In FIG. 9, three different physical data centers 902-904 are shown below planes representing the cloud-director layer of abstraction 906-908.

FIGS. 15A-G illustrate, using control-flow diagrams, communications between the VI management server and host server.

FIG. 22 illustrates additional compression of communications messages provided by the logical bridge discussed above with reference to FIGS. 17-21.

FIGS. 23A-B show a simplified example of translation of a native-protocol message to a bridge-protocol message.

DETAILED DESCRIPTION OF EMBODIMENTS

Figure 1:
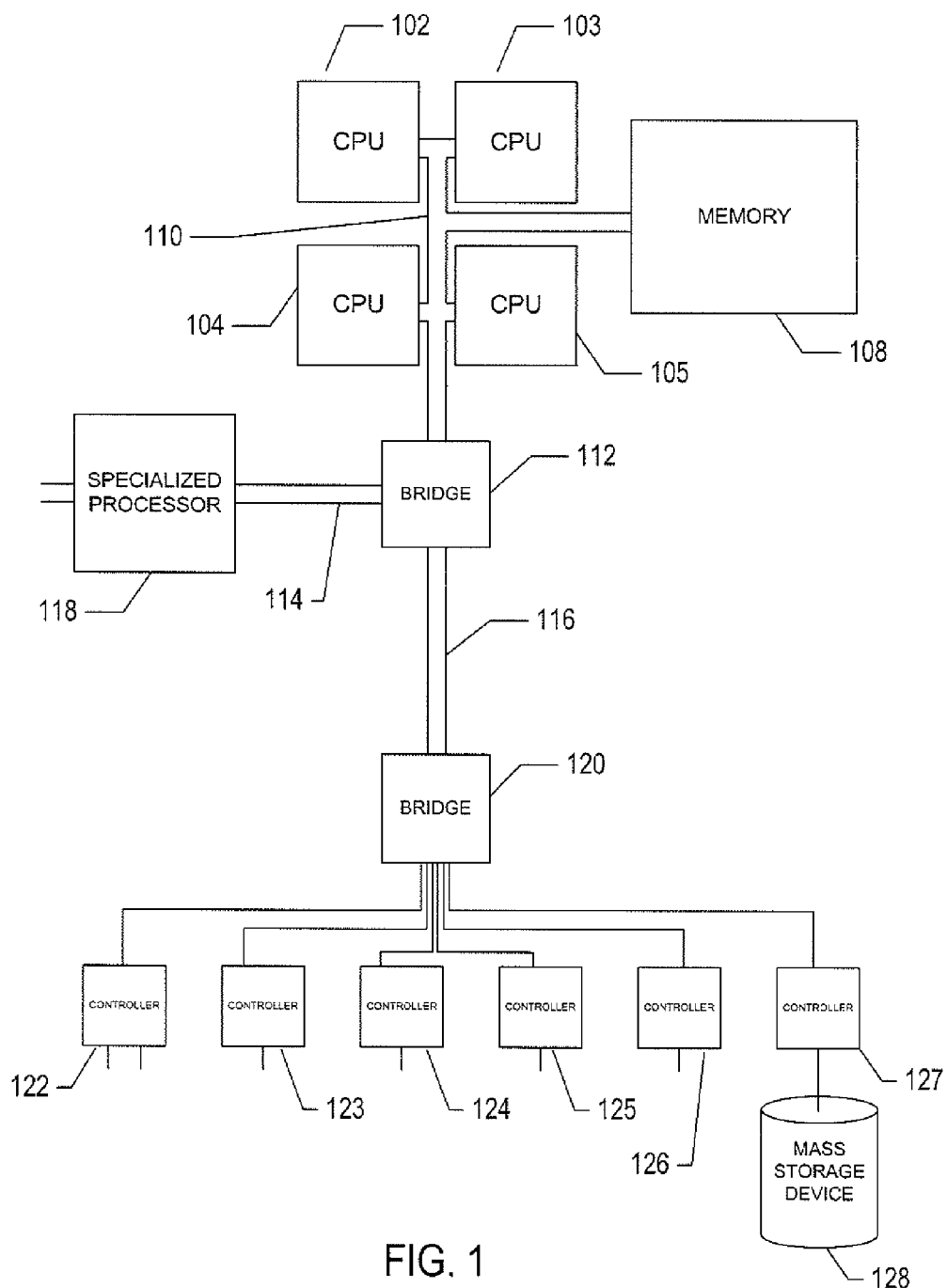
FIG. 1 provides a general architectural diagram for various types of computers.

The current document is directed to methods and systems that efficiently exchange information between management servers and remote host systems managed by the management servers over wide area networks. In a first subsection, below, a detailed description of computer hardware, complex computational systems, and virtualization is provided with reference to FIGS. 1-12. In a second subsection, host-gateway-facilitated aggregation of host servers into a higher-level distributed computing system is discussed. In a third subsection, implementations of the currently disclosed methods and systems are discussed.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
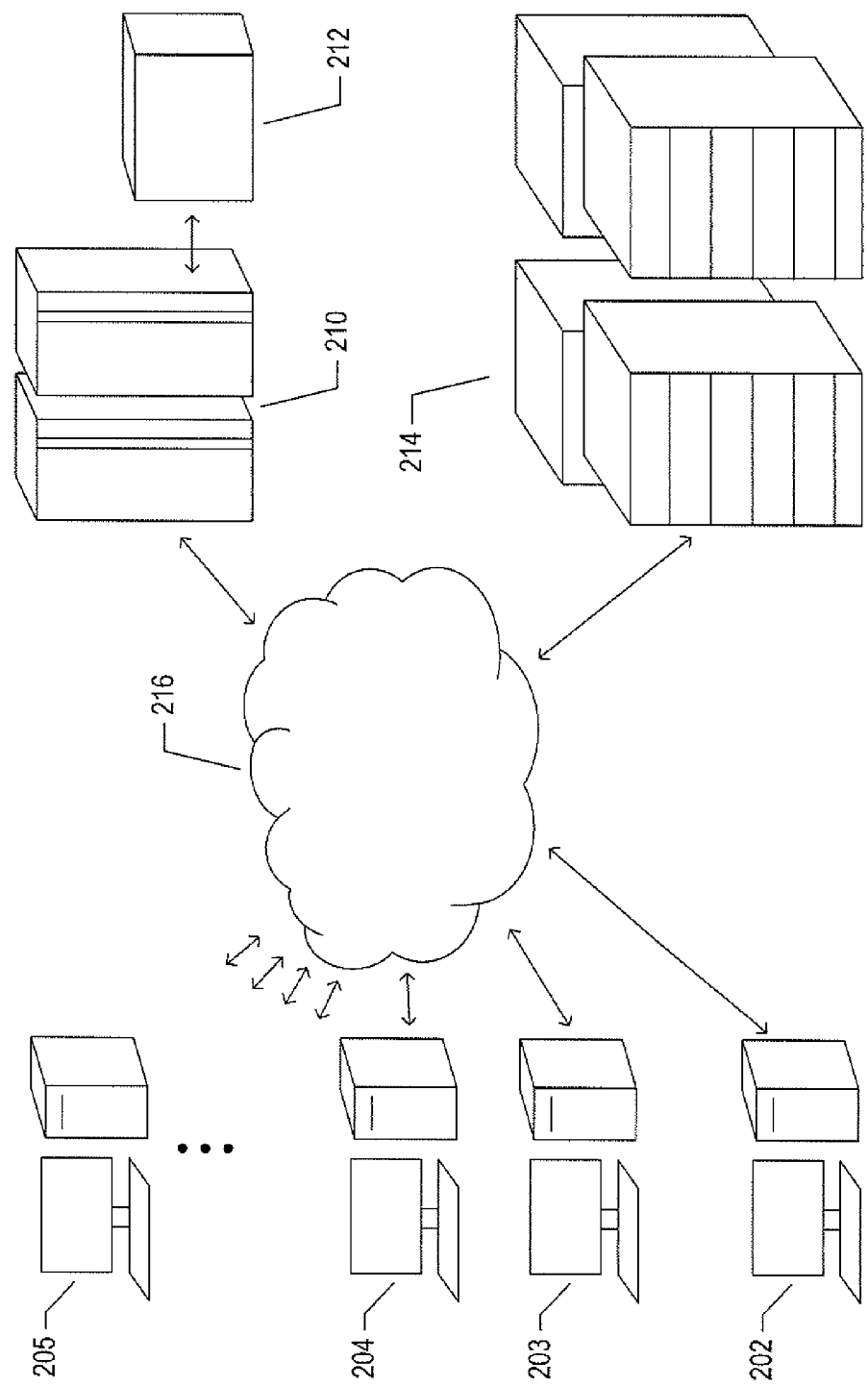
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
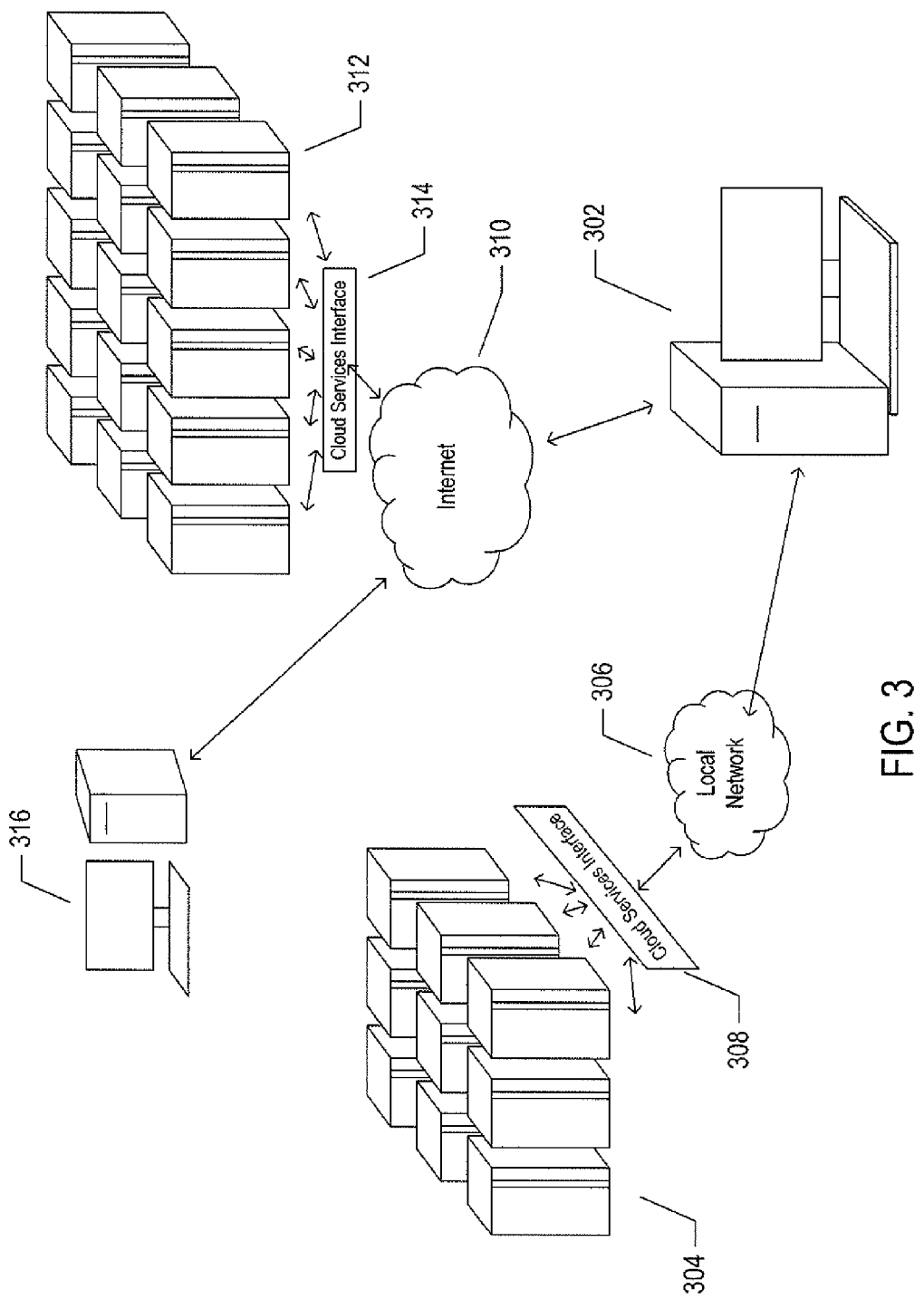
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
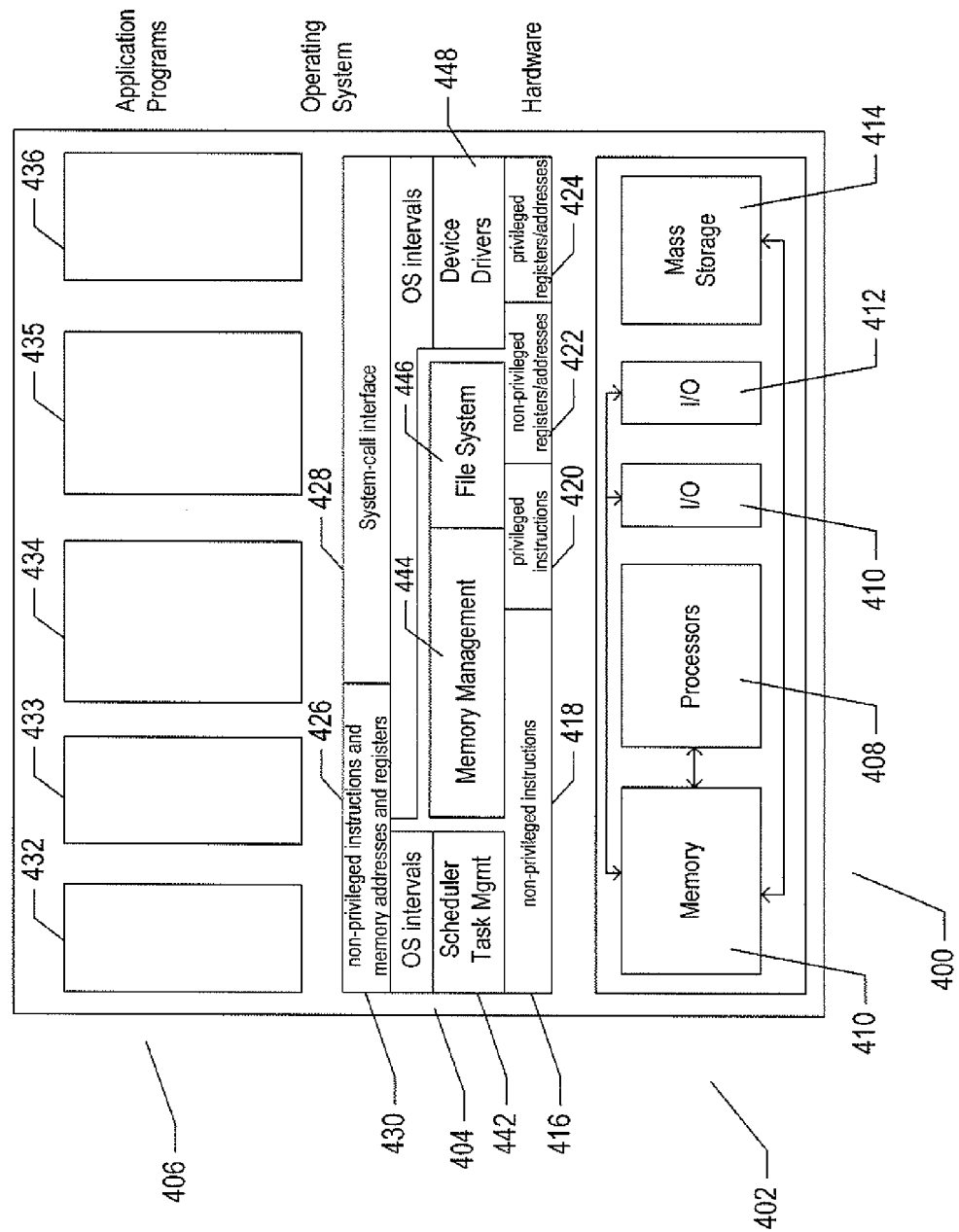
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
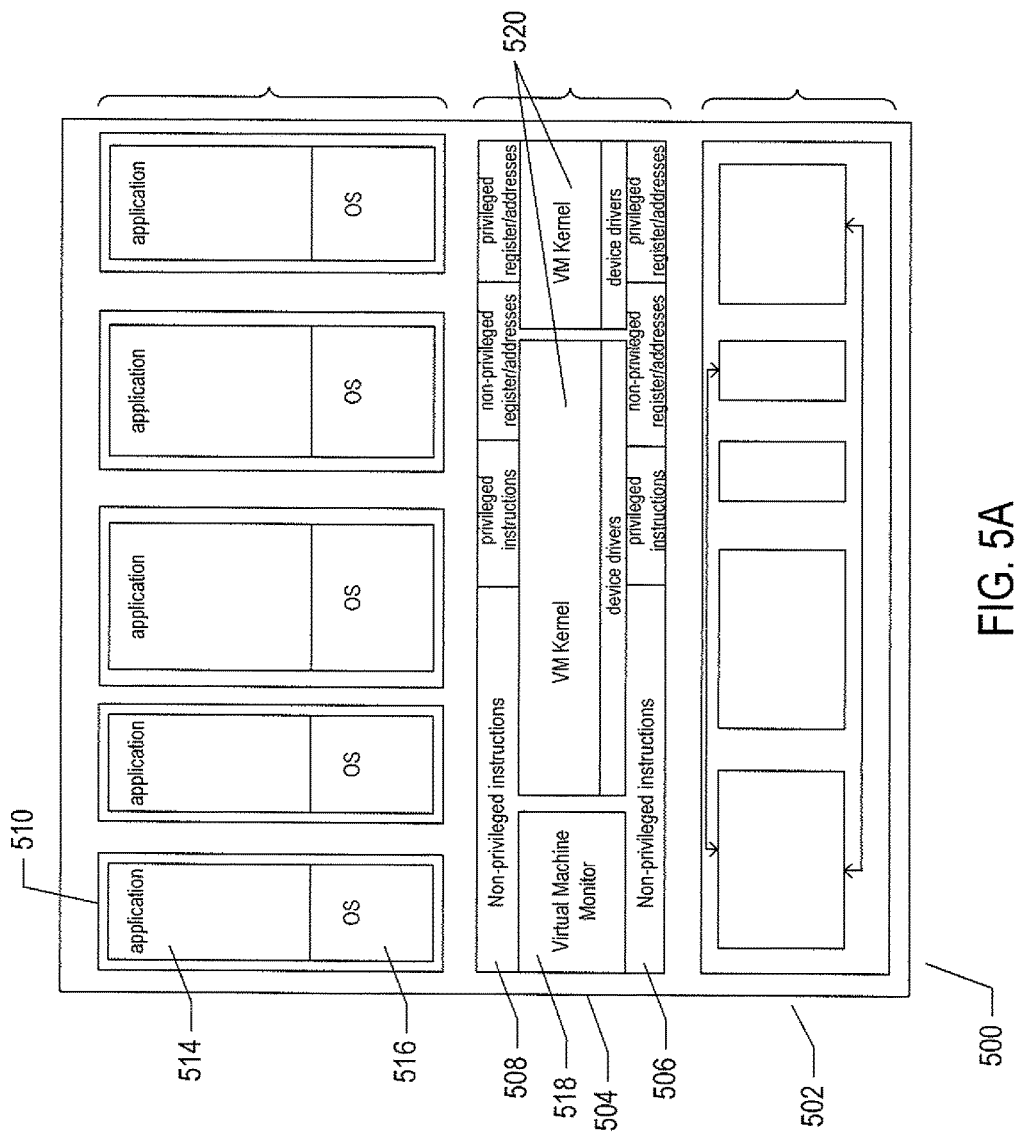
FIGS. 5A-B illustrate two types of virtual machine and virtual-machine execution environments.
Figure 5B:
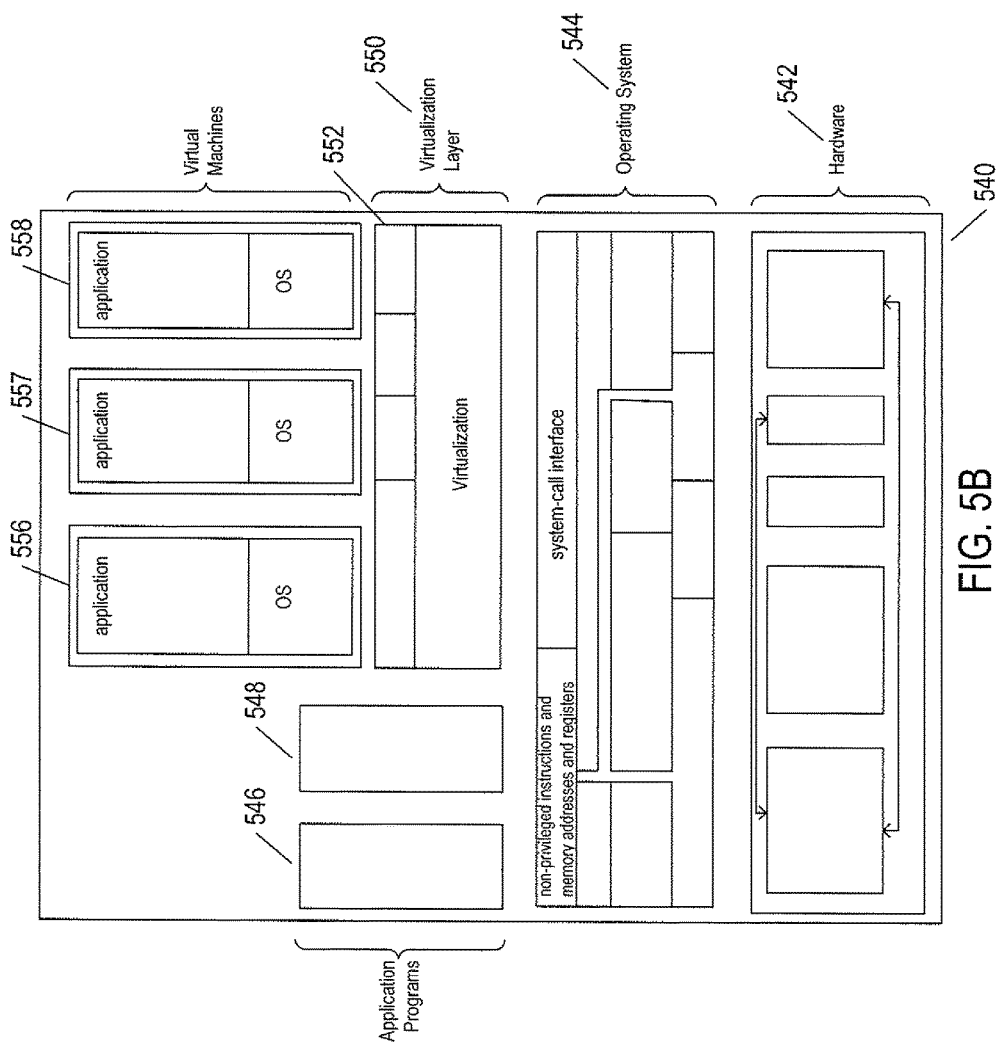

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
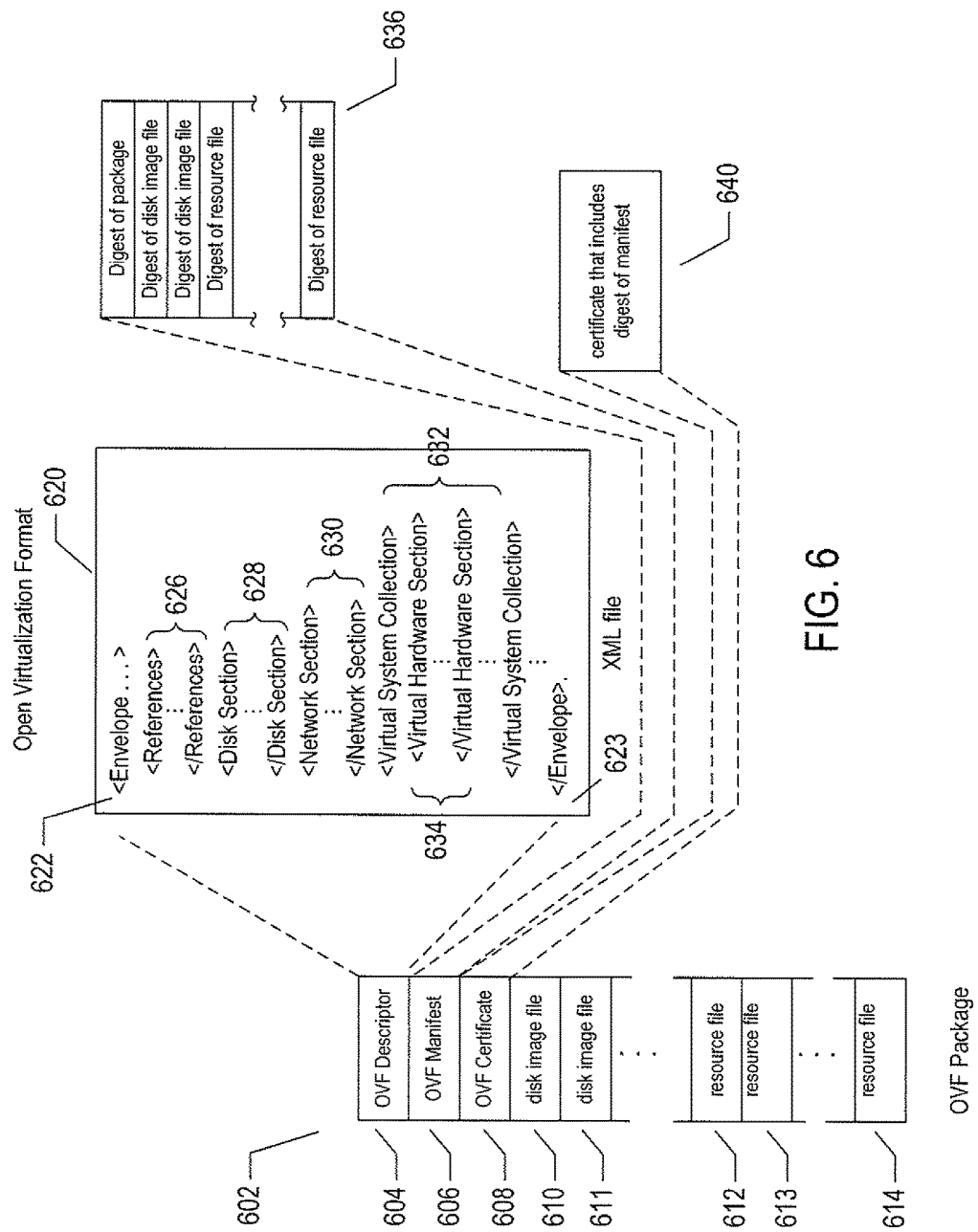
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
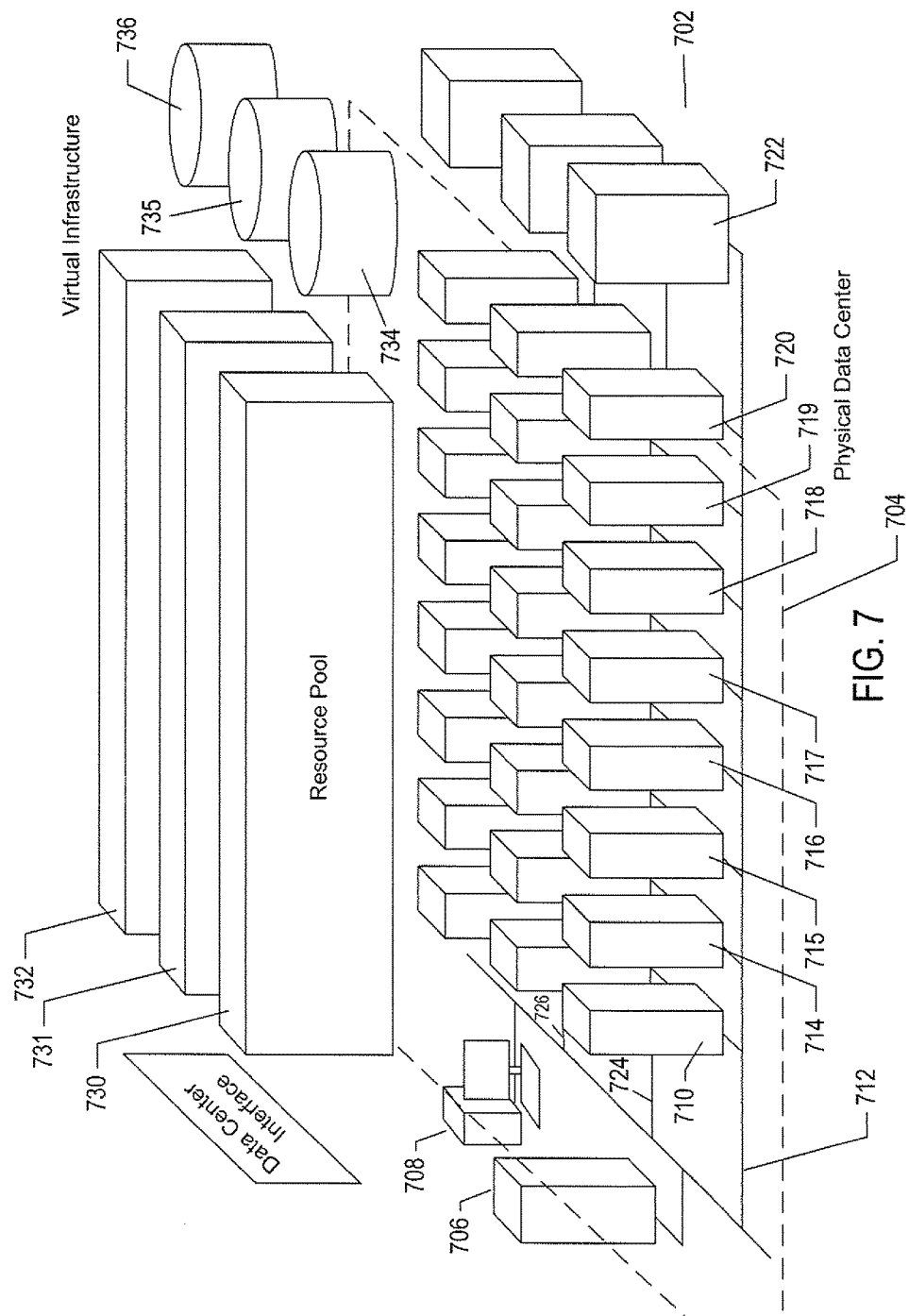
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
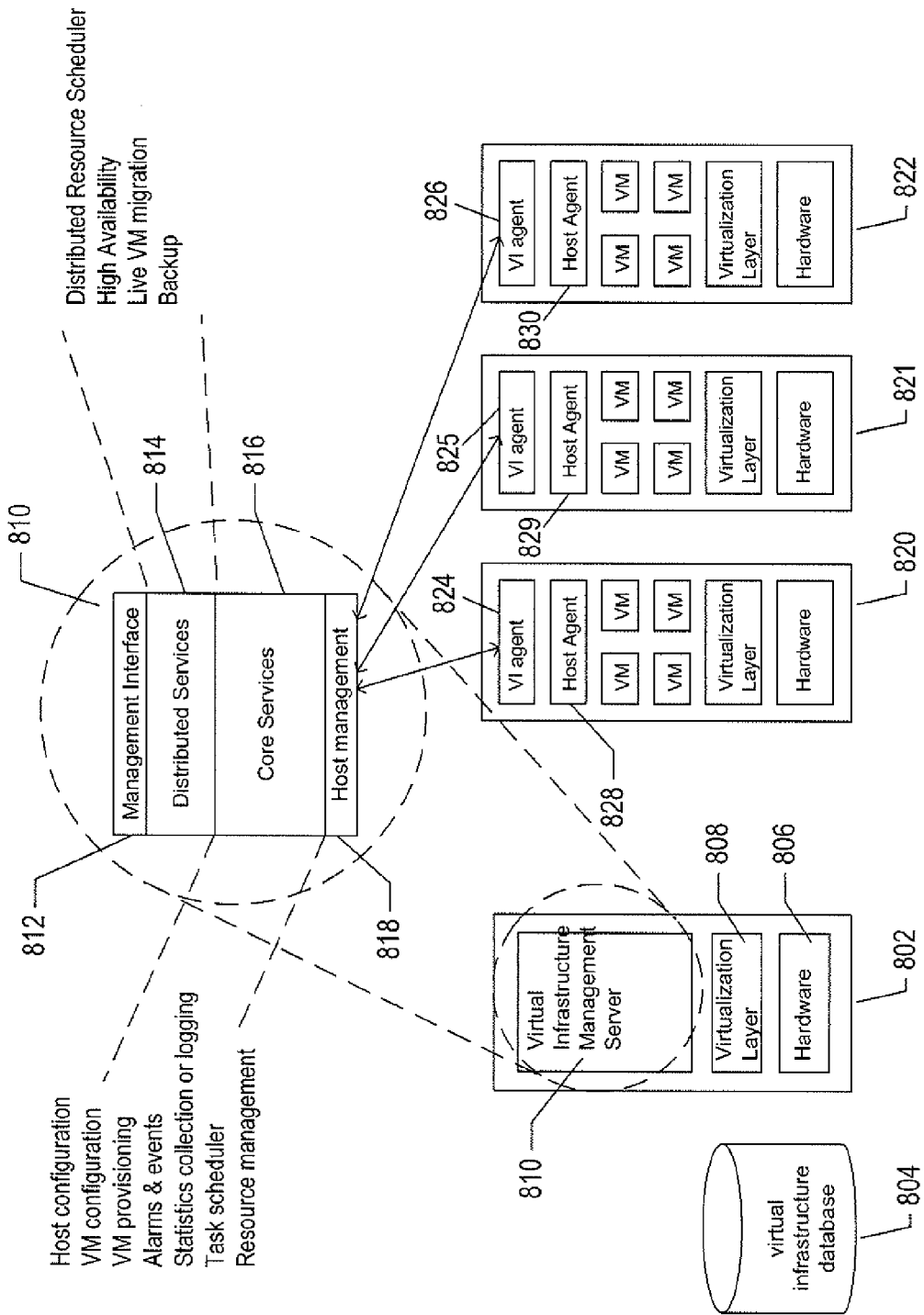
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808, and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
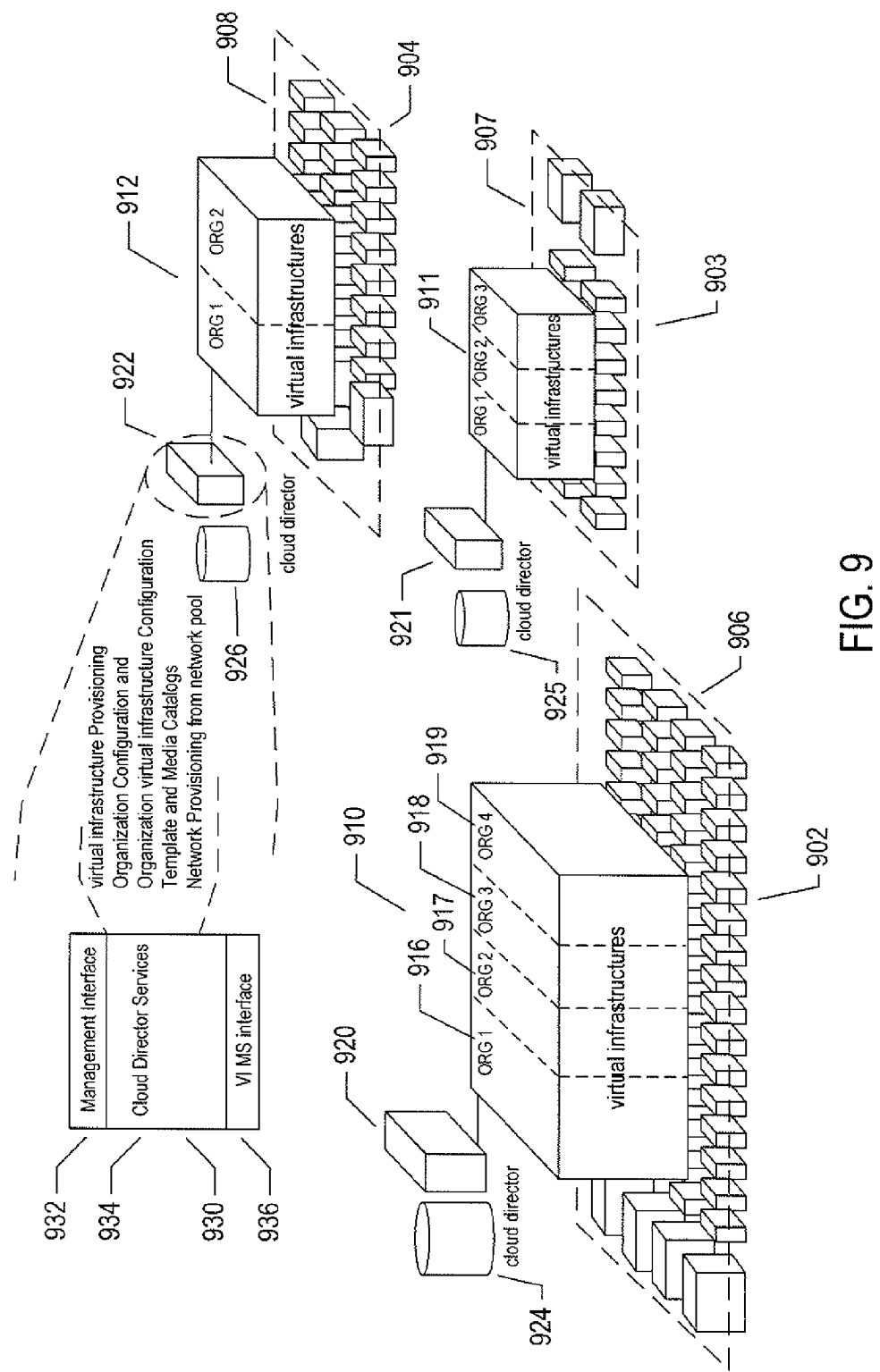
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
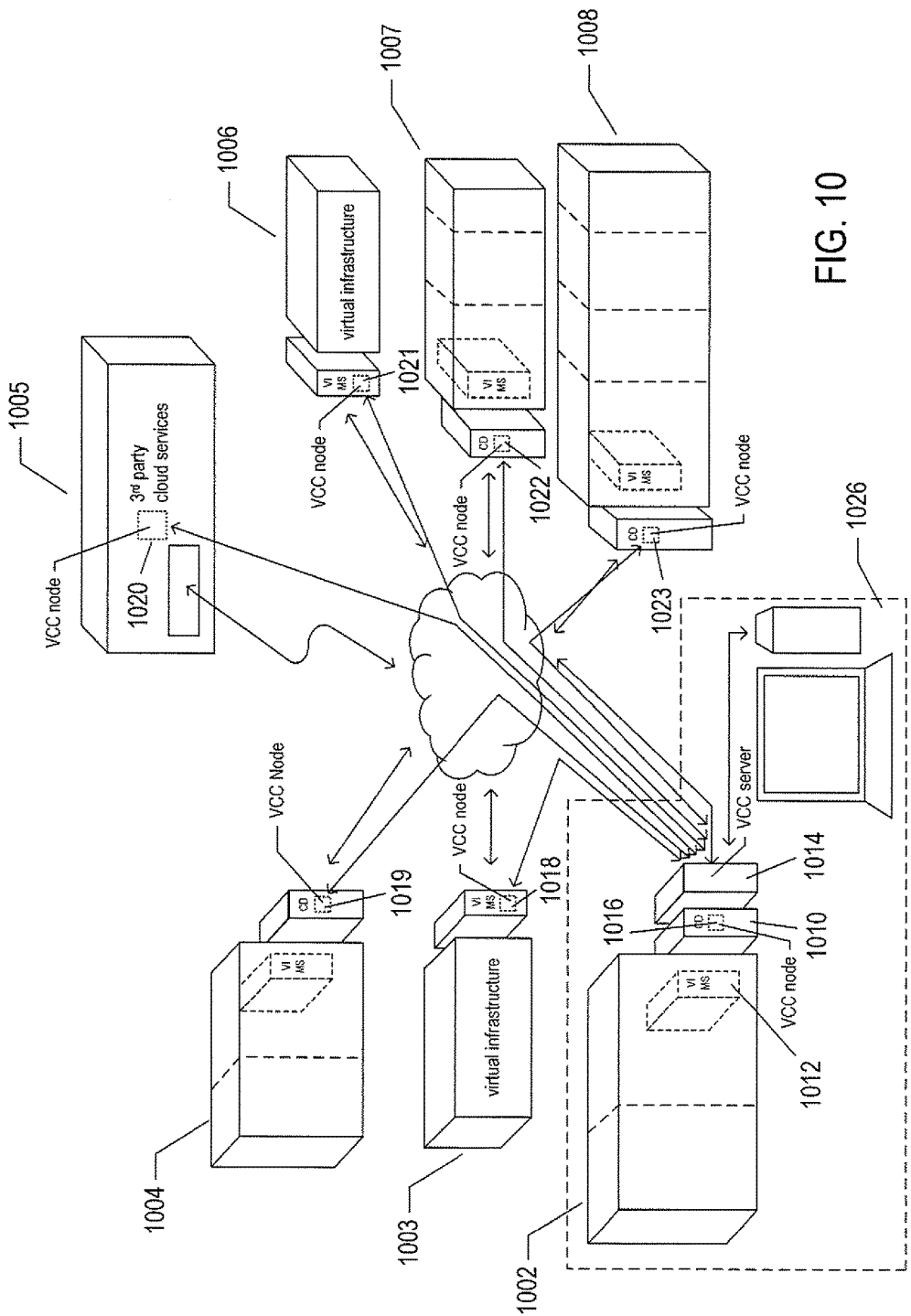
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11:
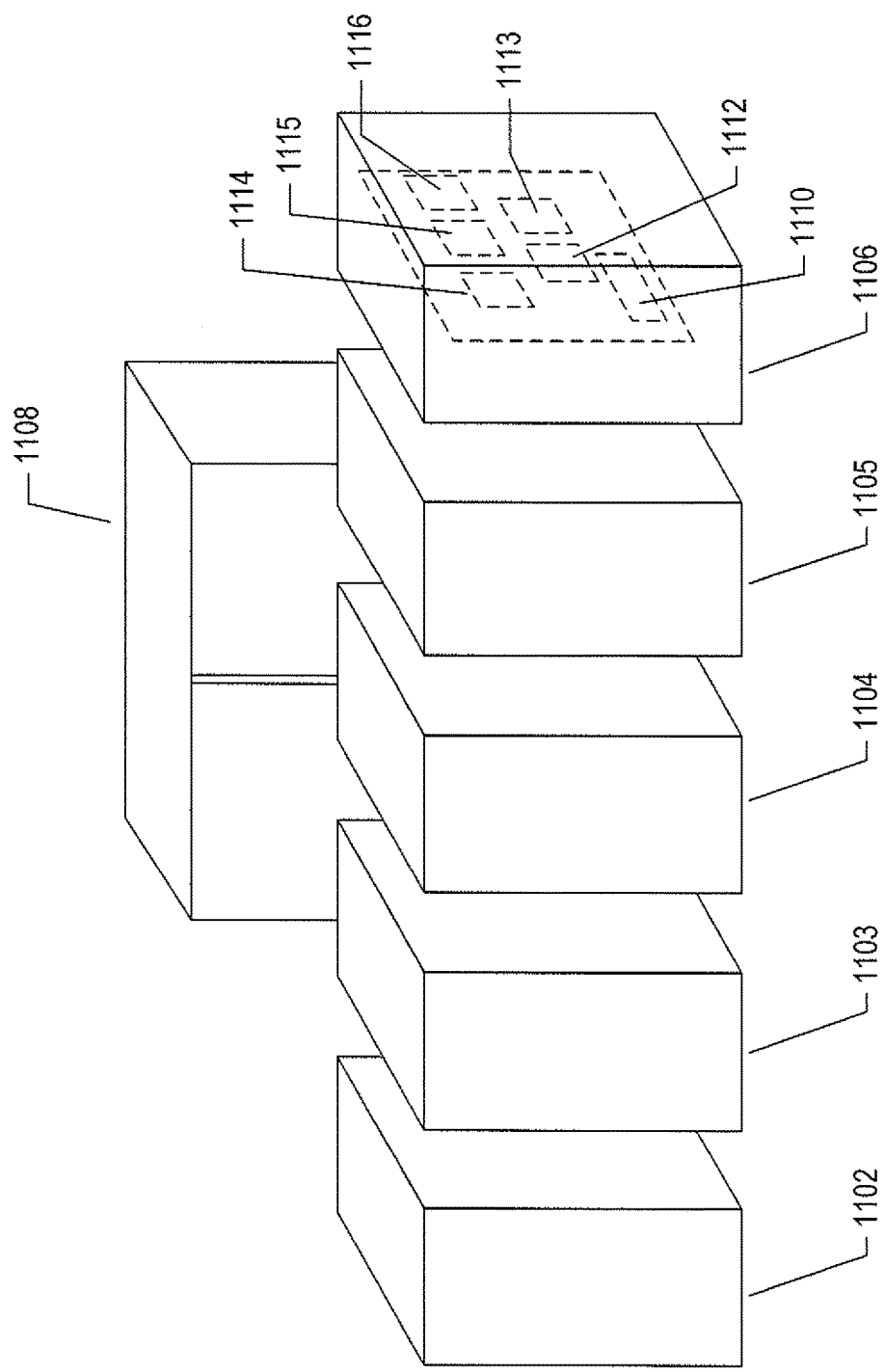
FIGS. 11-12 illustrate a resource pool, discussed briefly, above, with reference to FIG. 7.
Figure 12:
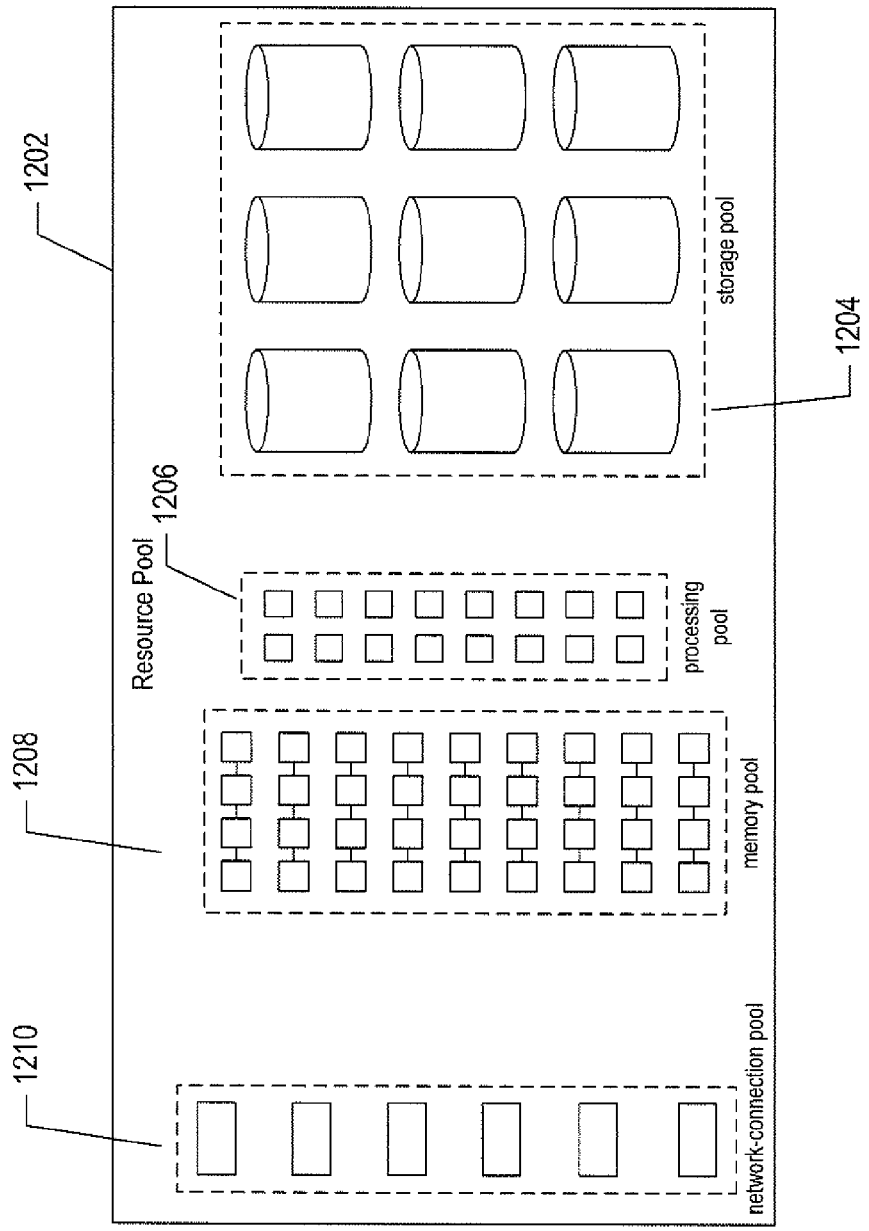

FIGS. 11-12 illustrate a resource pool, discussed briefly, above, with reference to FIG. 7. FIG. 11 shows a small cluster of physical computing machinery. In FIG. 11, five multi-processor servers 1102-1106 are shown along with a large data-storage-array enclosure 1108. Each of the server computers includes one or more network interconnect cards ("NICs") 1110, two or more processors 1112-1113, and generally multiple banks of integrated-circuit memory 1114-1116. The internal components of server 1106 are shown, in FIG. 11, as an example of the types of components contained within the remaining servers 1102-1105. Of course, server computers and storage arrays are extremely complex machines with hundreds to thousands of individual parts and subcomponents. FIG. 11 is intended only to illustrate the computing cluster at a high level.

FIG. 12 illustrates abstraction of the computing resources contained in the cluster shown in FIG. 11 as a resource pool. The resource pool 1202 includes a data-storage pool 1204, a processing pool 1206, a memory pool 1208, and a network-connection pool 1210. The storage pool 1204 is an abstract collection or aggregation of the data-storage resources of the cluster available to virtual machines for data storage, including portions of internal disk drives within the server computers as well as disk drives and other data-storage devices within the data-storage array 1108. The processing pool 1206 is an abstract aggregation of the processing bandwidth provided by hardware threads, cores, and processors within the server computers 1102-1106. Similarly, the memory pool 1208 includes the memory resources contained in the server computers 1102-1106 that are accessible for use by virtual machines. The network-connection pool 1210 is an abstract aggregation of the NICs and/or other communications hardware within the server computers 1102-1106 available for transmitting and receiving data at the request of virtual machines. The resource-pool abstraction represents, to virtual machines within a virtualized computer system, an overall, aggregate set of resources that can be accessed by the virtual machines without specifying the types and numbers of individual devices and components that are aggregated together to provide the overall bandwidth and/or capacity of the various component pools of the resource pool.

Figure 13:
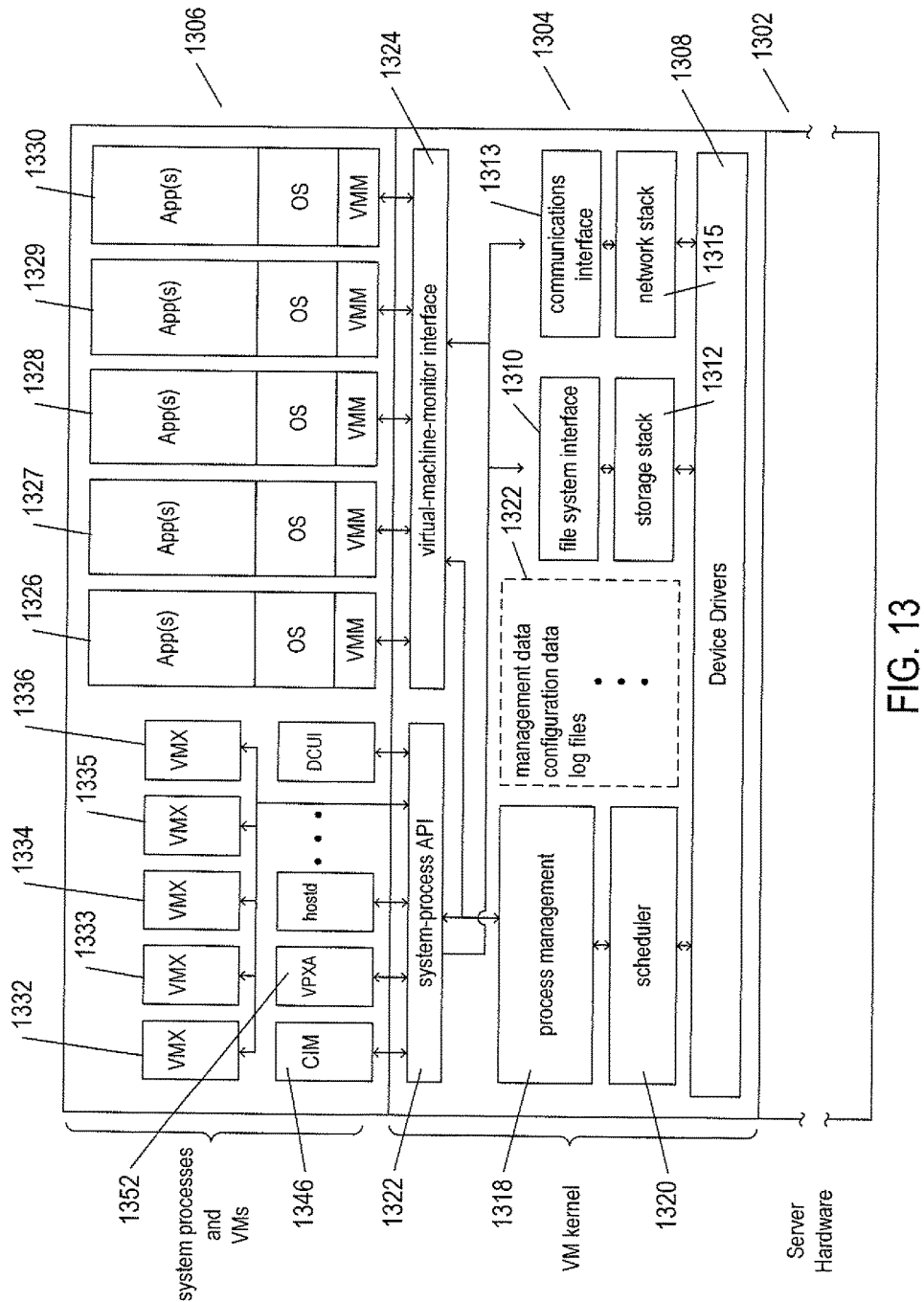
FIG. 13 provides additional details with regard to the internal components of a server computer, or host system, within a virtual data center.

Host-Gateway-Facilitated Aggregation of Host Servers into a Higher-Level Distributed Computing System FIG. 13 provides additional details with regard to the internal components of one implementation of a server computer, or host system, within a virtual data center. As discussed above, a host computer includes a hardware layer 1302, a virtualization layer 1304, and a system processes and virtual-machine layer 1306. The virtualization layer 1304 comprises, in the implementation shown in FIG. 13, a VM kernel that provides functionality similar to that provided by a traditional operating system. The VM kernel includes device drivers 1308 that interface directly with hardware components of the hardware layer 1302. The VM kernel provides a file system that includes a file-system interface 1310 and a layered file-system implementation referred to as a "storage stack" 1312. Similarly, the VM kernel provides a communications networking interface 1313, an underlying, layered communications and networking implementation referred to as a "network stack" 1315. Like an operating system, the VM kernel provides process management for managing concurrent, and, in multi-processor systems, simultaneous execution of multiple different processes 1318 and a scheduler 1320 that schedules access by various computational entities, including virtual machines and system processes, to hardware resources. The VM kernel stores a variety of different types of management data, configuration data, log files, and other such operational data 1322 in the file system 1310 and 1312. The VM kernel provides a system-process interface 1322 to support execution of a variety of different system processes and a virtual-machine-monitor interface 1324 that provides an execution environment for multiple virtual machines 1326-1330. The system processes that run within an execution environment provided by the system-process interface 1322 include VMX processes 1332-1336, each associated with a virtual-machine monitor 1338-1342. In addition, the system processes include a common-information model ("CIM") process 1346 that enables hardware-level management from remote applications and a direct-console user interface ("DCUI") 1348 that provides a configuration and management interface accessible through a host console. A hostd process 1350 provides a programmatic interface to the VM kernel and provides functionality such as user authentication, user authorization, and creation and management of local users. A VPXA process 1352 is an agent that uses a proprietary protocol to connect a VI management server with the hostd process and provides various types of functionalities, including a heartbeat and host-sync facilities, discussed below. In addition, a host system may include many additional agents and processes, including a high-availability agent, a syslog daemon, various storage-system and networking-related processes, and other processes involved in the operation and operational management of the host system.

Figure 14:
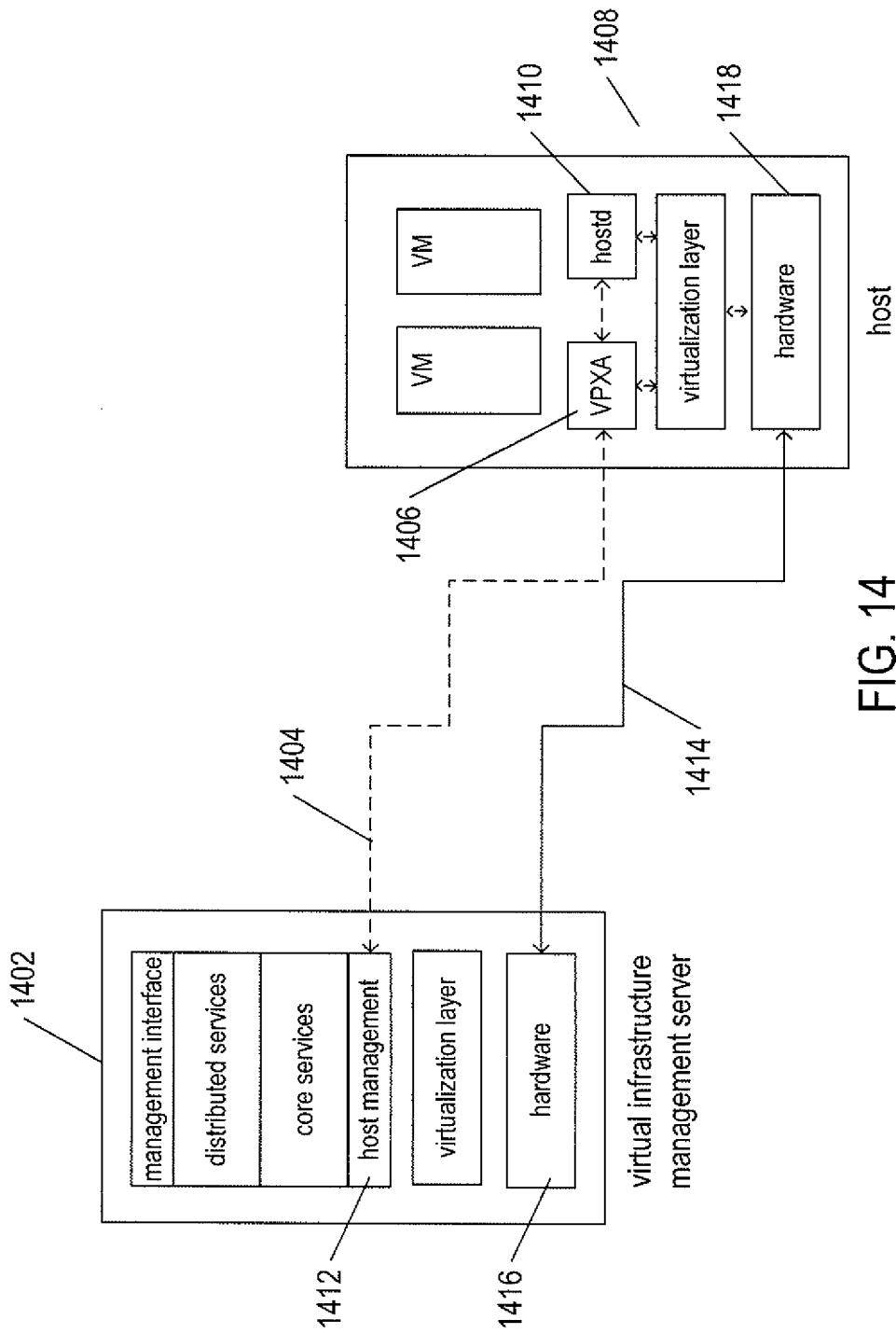
FIG. 14 illustrates communications between a VI management server and a host computer managed by the VI management server.

FIG. 14 illustrates communications between a VI management server and a host computer managed by the VI management server. In FIG. 14, the VI management server 1402 logically interfaces, as represented by dashed arrow 1404, to the VPXA agent or process 1406 within the host system 1408 in order to access management functionality provided both by the VPXA process 1406 as well as by the hostd process 1410. Of course, the logical communications between the host-management interface 1412 within the management application of the VI management server and the VPXA agent 1406 is implemented above an actual hardware interconnection 1414 between the hardware layers 1416 and 1418 of the VI management server and host system, respectively, generally involving local networking hardware and, in many cases, larger-scale communications infrastructures. Using the proprietary communications protocol provided by the host-management interface 1412 and VPXA agent 1406, the VI management server accesses a variety of different types of management functionality that allows the VI management server to configure, provision, power on, and power off virtual machines, move virtual machines among host systems, collect configuration information and operational statistics from the host system, configure various devices, system processes, and other entities within the host server, access information stored by the host server within the VM kernel file system, and many other host management facilities.

Figure 15A:
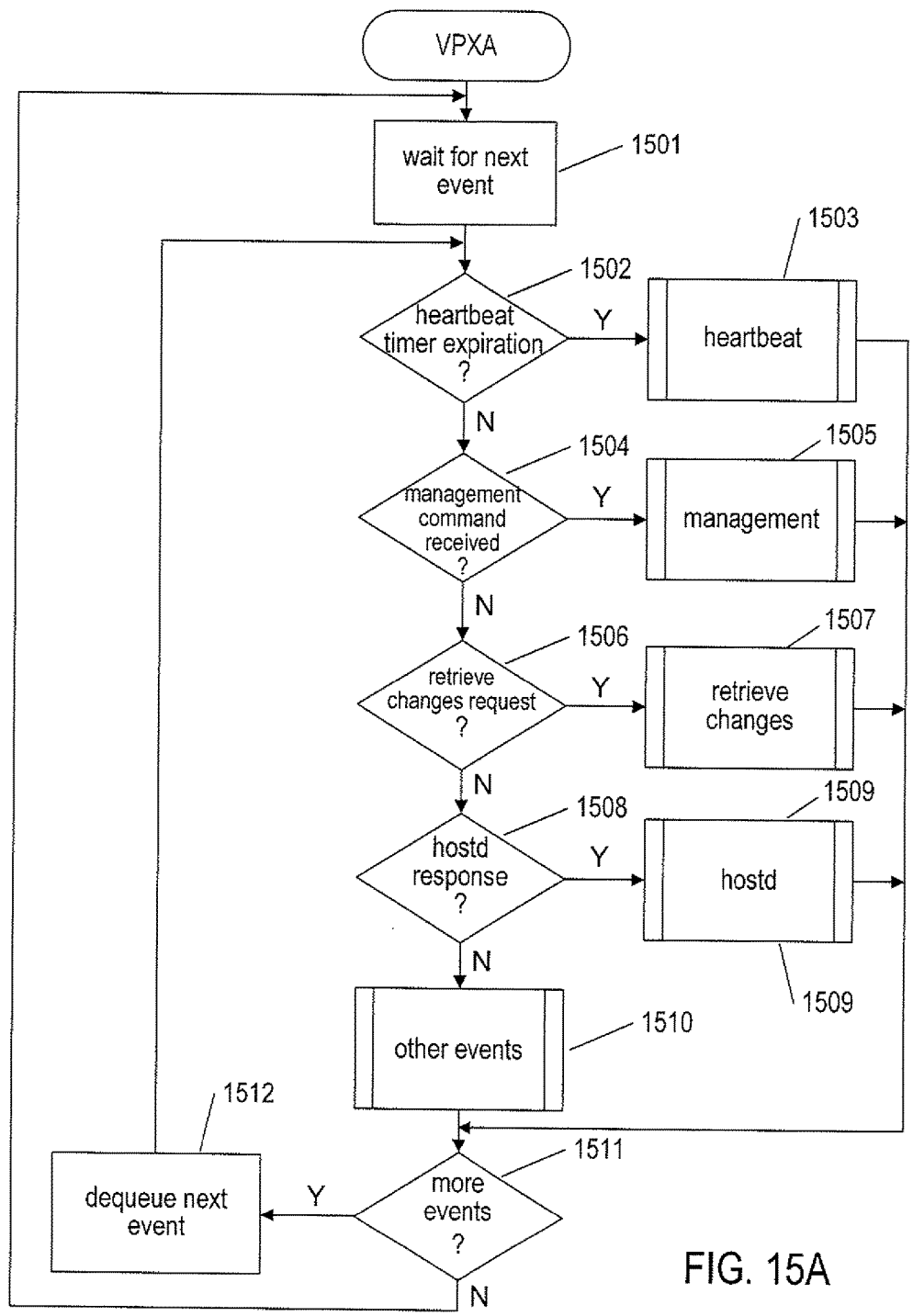

FIGS. 15A-G illustrate, using control-flow diagrams, communications between the VI management server and host server. FIG. 15A shows an event loop that continuously executes within the VPXA agent in order to respond to events, including timer expirations and messages received from the VI management server. In step 1501, the VPXA event loop waits for a next event to occur. When a next event occurs, then the type of event is determined, in a subsequent series of conditional blocks. Once determined, the event is handled by a call to an event handler. When, for example, the event is a heartbeat-timer expiration, as determined in step 1502, then a heartbeat handler is called in step 1503. When a management command is received from the VI management server, as determined in step 1504, then a management-command handler is called in step 1505. When a retrieve-changes request is received in step 1506, then a retrieve-changes handler is called in step 1507. The retrieve-changes request is part of the host-sync operation, in which, as a result of a heartbeat message, a VI management server determines that the configuration of a host has changed and seeks the configurations for local storage by issuing a retrieve-changes request. When a response from the hostd process is received, as determined in step 1508, then a hostd handler is called in step 1509. A default handler 1510 is shown in FIG. 15A that handles other types of events that occur with respect to the VPXA agent. When, after handling the most recently occurred event, another event has been received and queued to an input event queue, as determined in step 1511, then a next event is dequeued from the input queue, in step 1512, and control returns to step 1502. Otherwise, control returns to step 1501 where the VPXA event loop waits for a next event to occur.

Figure 15B:
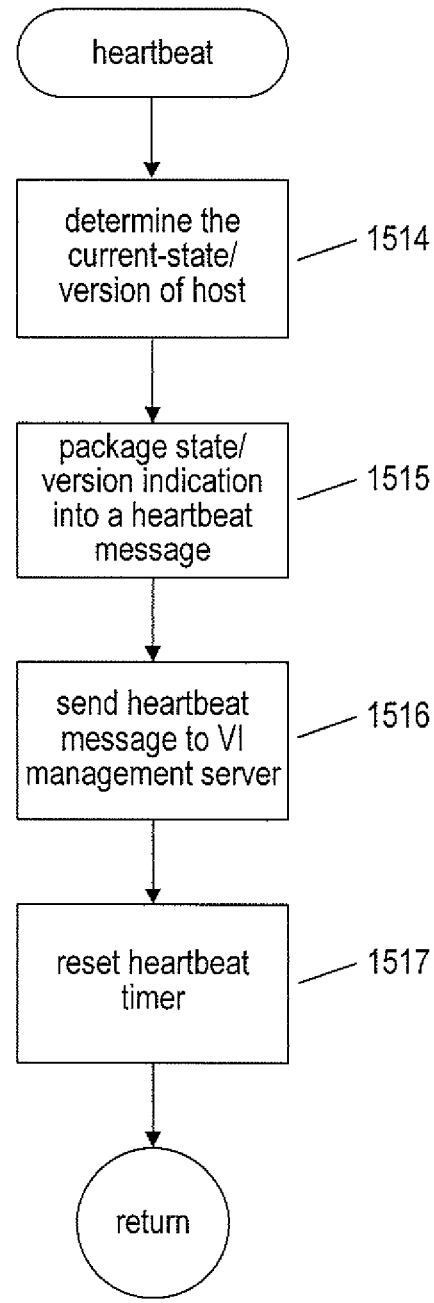

FIG. 15B illustrates the heartbeat handler called in step 1503 of FIG. 15A. In step 1514, the heartbeat handler determines a current state/version that represents the current operational status of the host server. The state/version indication is, in one implementation, an alphanumeric symbol string or a series of one or more symbol strings and floating-point numbers. The state/version indication is of sufficient length, and therefore has a sufficient number of different possible values, to uniquely assign a state/version indication value to each significant operational state of the host server system. In step 1515, the heartbeat handler packages the state/version indication into a heartbeat message which, in step 1516, the handler sends to the VI management server via the logical communications path between the host-management interface within the VI management server and the VPXA agent within the host server. Finally, in step 1517, the heartbeat handle resets the heartbeat timer in order to specify the time at which a next heartbeat message is sent to the VI management server. The heartbeat message is provided by the VPXA agent to allow the VI management server to track and monitor the operational status of host servers managed by the VI management server and to quickly recognize a host-server failure in order to restart VMs that were executing on the failed host server on other host servers.

Figure 15C:
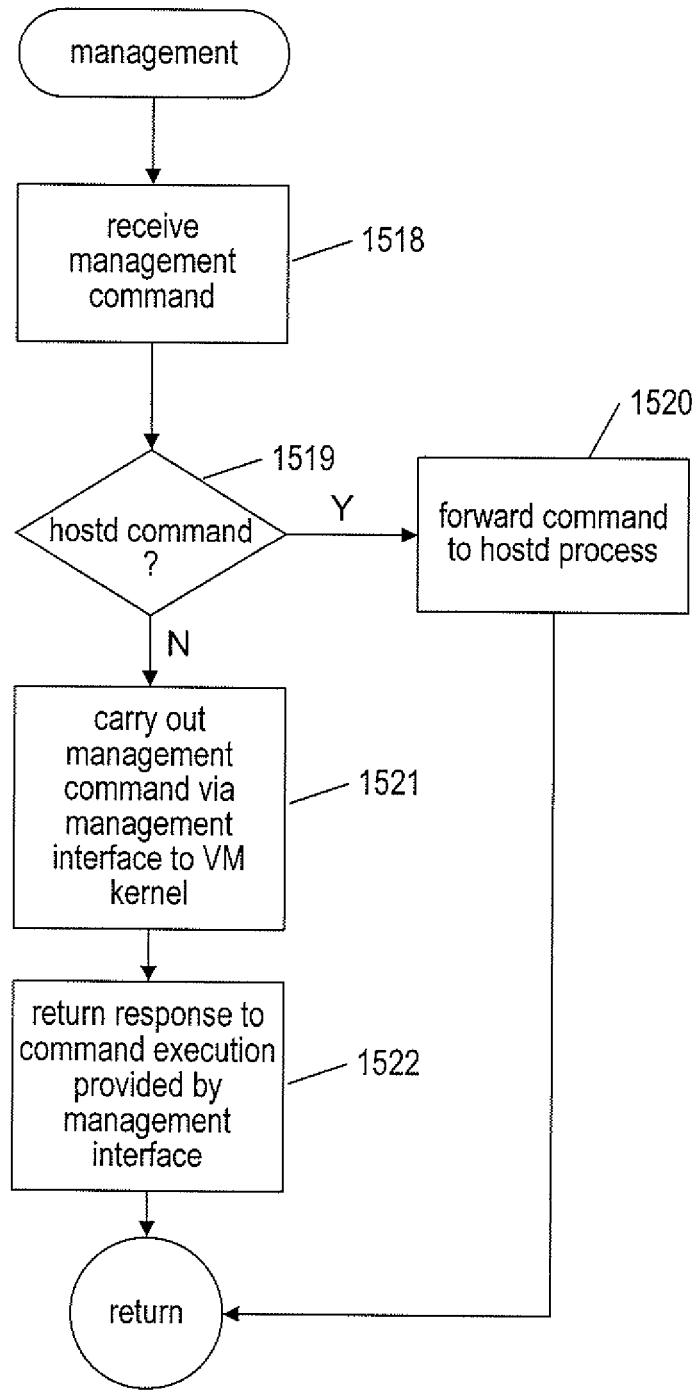

FIG. 15C illustrates the management handler called in step 1505 of FIG. 15A. In step 1518, the management handler receives the management command that was received by the VPXA agent from the VI management server. When the management command is a management command directed to the hostd process, as determined in step 1519, the management command is forwarded to the hostd process for execution, in step 1520. When the hostd process finishes executing the command, a hostd response is returned to the VPXA agent and handled by a hostd handler, called in step 1509 of FIG. 15A. Otherwise, in step 1521, the management handler accesses a management interface provided by the VM kernel to carry out the management command on behalf of the VI management server. In step 1522, the response from the management interface of the VM kernel is received and returned to the VI management server. In certain cases, although not shown in FIGS. 15A-G, the management handler may terminate after submitting the management command to the VM kernel management interface, with the VM kernel management interface subsequently generating an event for command completion that is handled by a separate event handler, just as the hostd event handler handles responses from the hostd process.

FIG. 15D shows the retrieve-changes handler called in step 1507 of FIG. 15D. In step 1524, the retrieve-changes handler receives a retrieve-changes command received by the VPXA agent from the VI management server and extracts a state/version indication from the retrieve-changes command. This is the state/version indication which the VI management server considers to be the current state/version of the host server. However, because a different state/version indication was returned by the VPXA agent in a previous heartbeat message, the VI management server has requested the retrieve-changes operation in order to obtain updated status and configuration information for the host server. In step 1525, the retrieve-changes handler determines the differences between the current configuration and operational status of the host server and the configuration and operational status that the host server had when the extracted state/version indication was returned to the VI management server. These configuration differences are packaged into a message stream, transmission of which is initiated in step 1526. One of the significant motivations for creation of the VPXA agent and proprietary protocol by which the VPXA agent communicates with the host-management interface within the VI management server is that the heartbeat messages and host sync operation provide more efficient monitoring and configuration-change information exchange between the VI management server and host servers than a direct interconnection between the VI management server and the hostd process.

FIG. 15E illustrates the hostd handler called in step 1509 of FIG. 15A. In step 1527, the hostd handler receives a response to a command executed by the hostd process on behalf of the VI management server. In step 1528, the VPXA agent matches the received response to a previously received management command from the VI management server and then, in step 1529, returns the received response from the hostd process to the VI management server in the context of the previously received command from the VI management server.

Figure 15F:
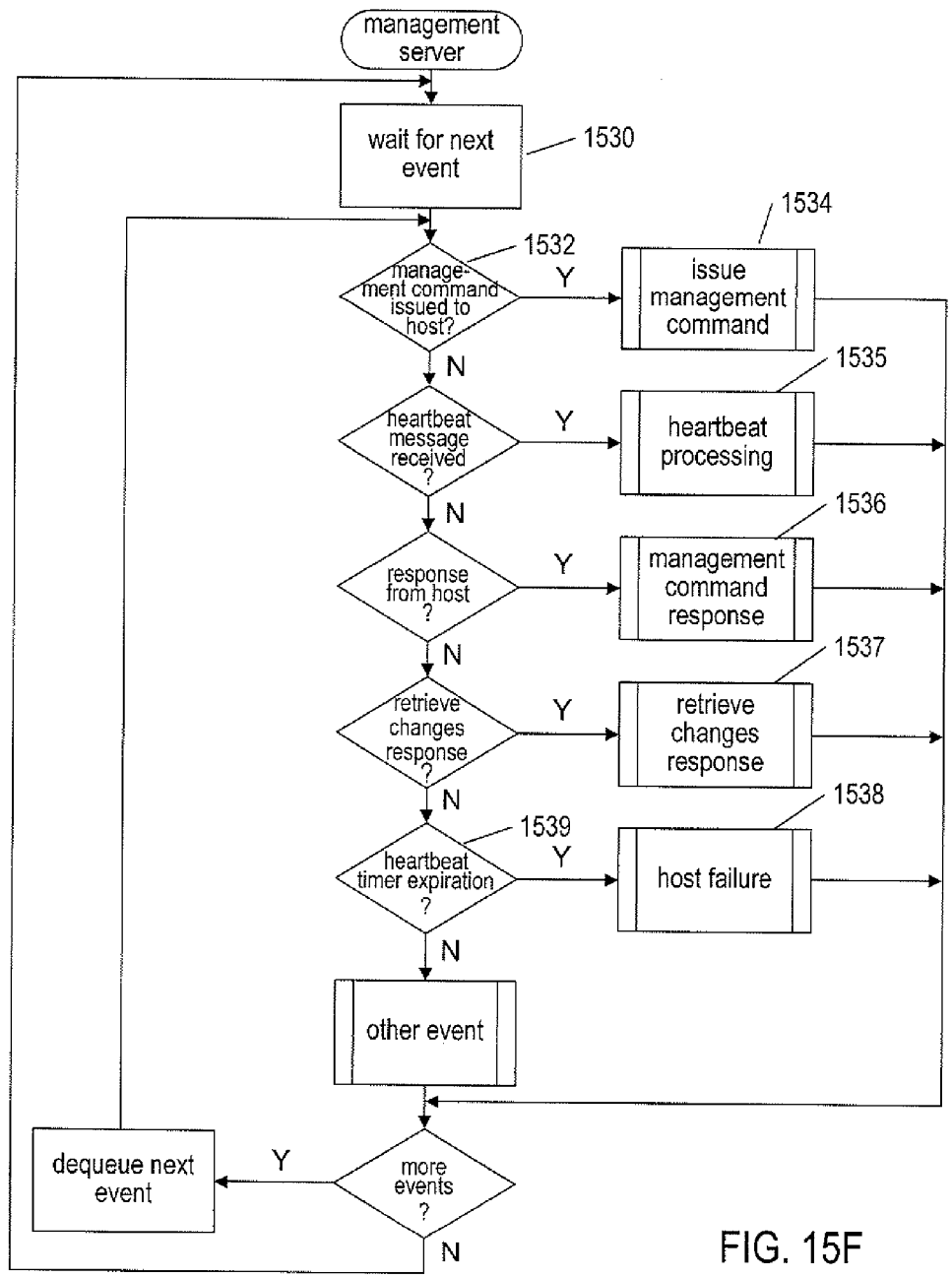

FIG. 15F shows an event loop that runs within the management process of the VI management server that provides the host-management interface that communicates with the VPXA agents and host servers managed by the VI management server. The event loop shown in FIG. 15F is similar to the event loop shown in FIG. 15A for the VPXA agent. The management-server event loop waits for a next event to occur in step 1530. Each different type of event, determined by a sequence of conditional steps, such as conditional step 1532, results in a call to a corresponding handler, as in the event loop discussed above with reference to FIG. 15A. Calls to handlers explicitly shown in FIG. 15F include a call to a handler that issues management commands to host servers 1534, a heartbeat-message-processing handler 1535, a handler for received responses to issued management commands 1536, a handler for receiving processing responses to retrieve-changes commands 1537, and a host-failure handler 1538 that is called to handle host failure events detected by expiration of a heartbeat timer associated with the host, identified in conditional step 1539. In the interest of brevity, only the heartbeat-processing handler 1535 is further discussed.

Figure 15G:
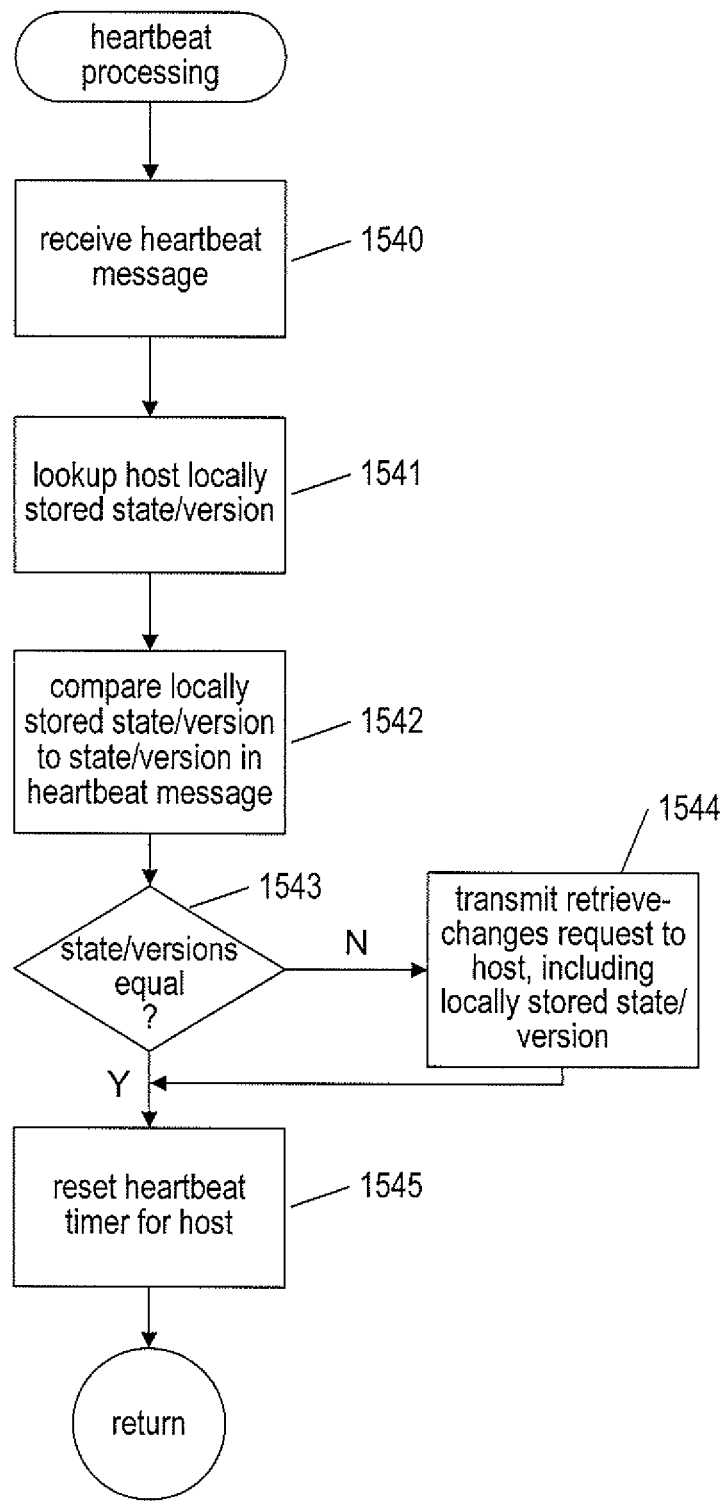

FIG. 15G illustrates the heartbeat-processing handler called at step 1535 of FIG. 15F. In step 1540, the heartbeat-processing handler receives a heartbeat message forwarded to the management server from a host server. In step 1541, the heartbeat-processing handler looks up the current state/version indication stored for the host server from which the heartbeat message was received. In step 1542, the heartbeat-processing handler compares the locally stored state/version indication with the state/version indication contained in the heartbeat message. When the two state/version indications are not equal, as determined in step 1443, then the heartbeat-processing handler, in step 1544, transmits a retrieve-changes request to the host server from which the heartbeat message was received, including in the retrieve-changes request the locally stored state/version indication. Finally in step 1545, the heartbeat timer for the host from which the heartbeat message was received is reset.

The host-management-interface/VPXA agent communications protocol and information exchanged include many additional details not shown in FIGS. 15A-F. A full description of these interfaces, the commands and information exchanged through them, and other details of VPX-agent implementation and VI-management-server implementation would require many hundreds of pages of description and hundreds of illustrative figures. However, these details are unnecessary for describing host-cluster aggregation via host gateways, and are therefore omitted from the current document.

Figure 16A:
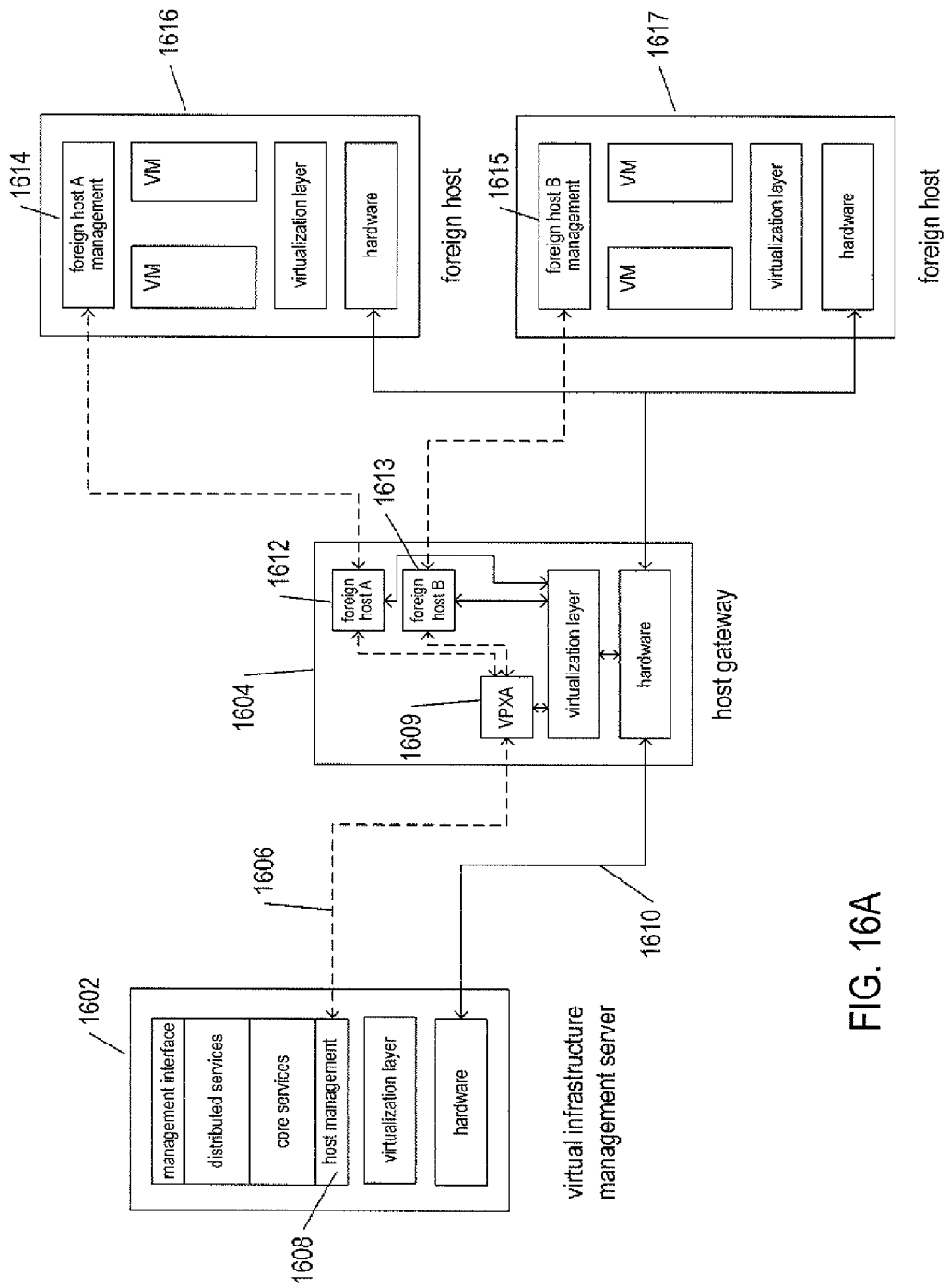
FIGS. 16A-E illustrate a host-gateway appliance that has been developed in order to, among other things, connect hosts running different types of virtualization layers to a VI management server that includes a host-management interface designed to interface to host servers with a specific type of virtualization layer.

FIGS. 16A-E illustrate a host-gateway appliance that has been developed in order to, among other things, connect hosts running different types of virtualization layers to a VI management server that includes a host-management interface designed to interface to host servers with a specific type of virtualization layer. FIG. 16A shows interconnection of a VI management server via a host-gateway appliance to two foreign hosts. Foreign hosts are host servers running virtualization layers different from the virtualization layer to which the host-management interface within the VI management server is designed to interface. As in FIG. 14, the VI management server 1602 connects to the host-gateway appliance 1604 via a logical communications pathway 1606 provided by the host-management interface 1608 within the VI management server, a VPXA agent 1609 within the host-gateway appliance 1604, and an underlying hardware-level communications pathway 1610. However, within the host-gateway appliance, the VPXA agent interfaces to a first foreign-host adapter 1612 and a second foreign-host adapter 1613 that, in turn, interface to foreign-host management interfaces 1614 and 1615, respectively, within a first foreign host system 1616 and a second foreign host system 1617. In general, the host-gateway appliance includes a different foreign-host adapter for each different type of virtualization layer included in the foreign-host systems interconnected by the host-gateway appliance to the VI management server. In essence, the foreign-host adaptors 1612 and 1613 implement communications pathways to foreign-host management interfaces that replace or substitute a hostd process within a host executing the virtualization layer to which the host-management interface of the VI management server is designed to interface.

Figure 16B:
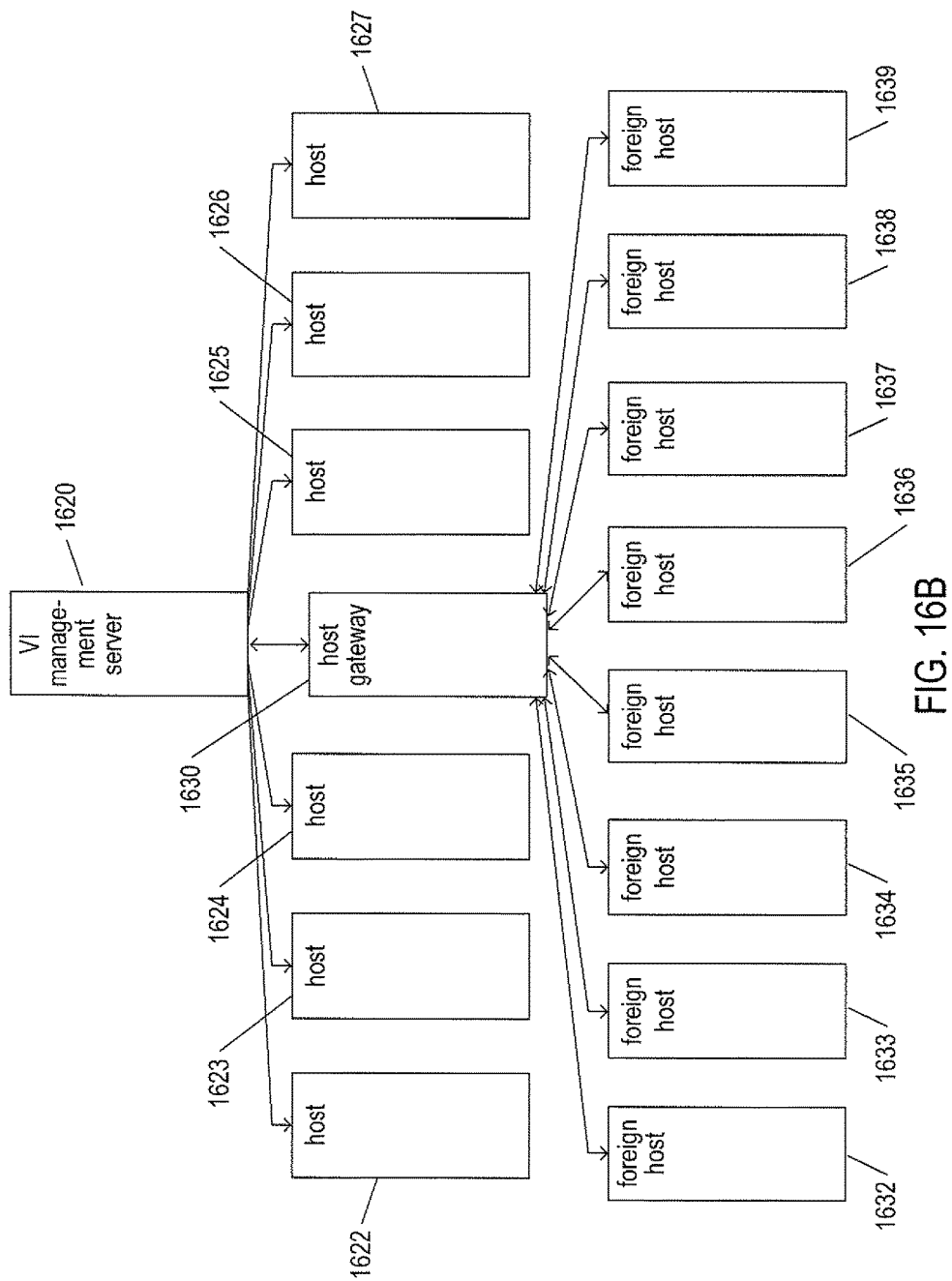

FIG. 16B illustrates a virtual data center that includes both native hosts managed directly by a VI management server and foreign hosts managed by the VI management server via a host-gateway appliance. In FIG. 16B, the VI management server 1620 manages native host systems 1622-1627 through the host-management-interface/VPXA-agent communications pathway discussed above with reference to FIG. 14. The VI management server 1620 additionally connects to a host-gateway appliance 1630, as discussed above with reference to FIG. 16A, in order to interface to, and manage, a number of foreign host servers 1632-1639. In order to provide an interconnection between the VI management server and foreign hosts, the host-gateway appliance includes a VPXA agent that is modified to interface to foreign-host adapters, rather than to a single hostd process, as discussed above with reference to FIG. 14.

Figure 16C:
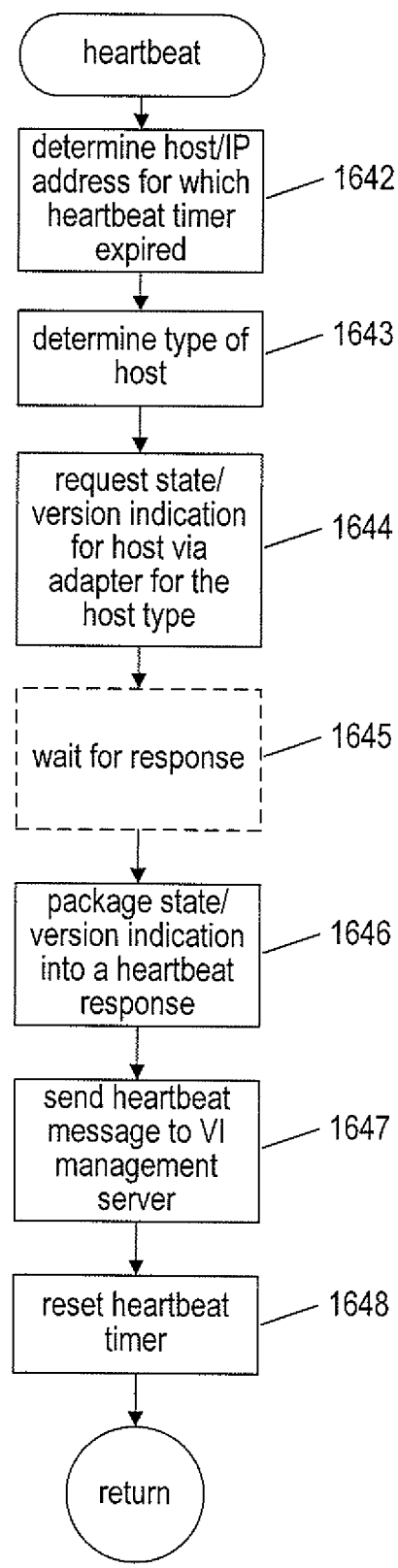
Figure 16D:
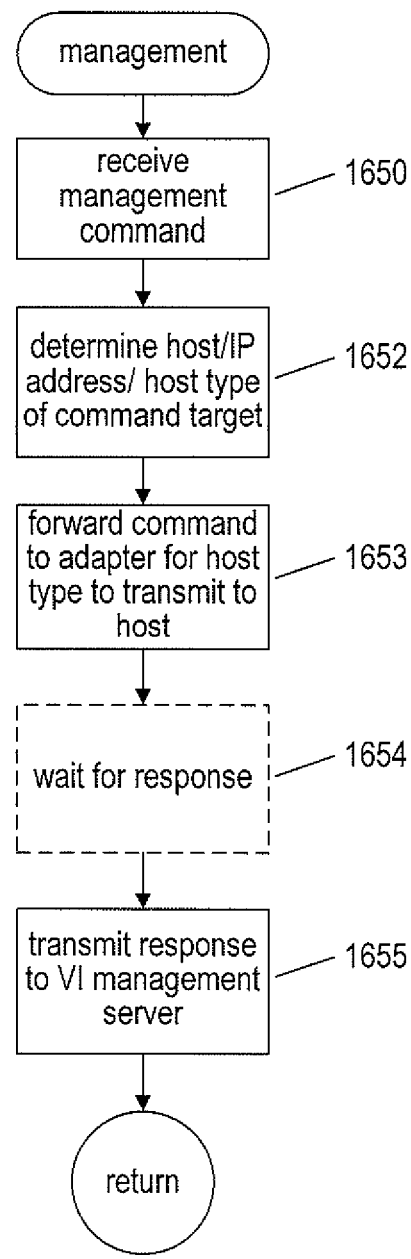
Figure 16E:
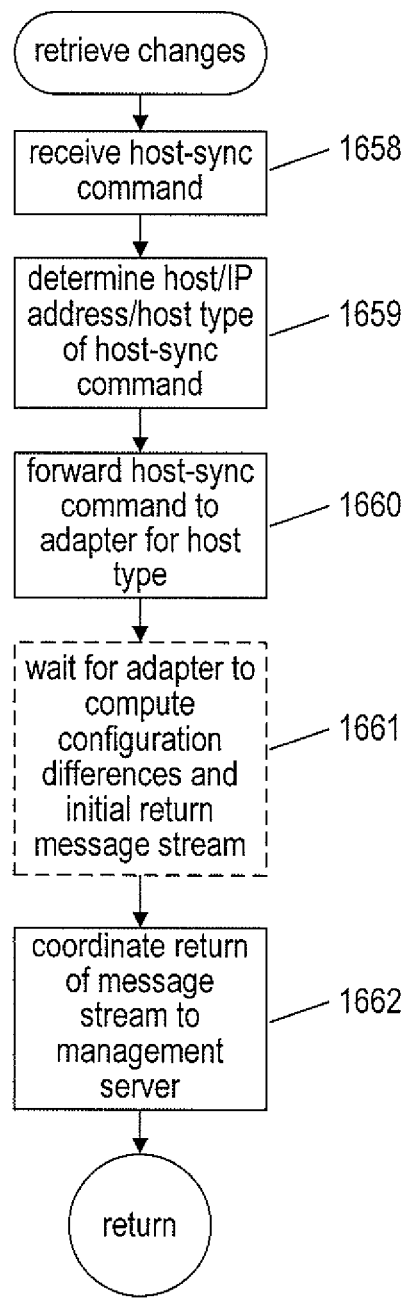

FIGS. 16C-E illustrate, using control-flow diagrams, modifications to the event handlers discussed above with reference to FIGS. 15B-D that execute within an event loop of a native VPXA agent running within a native host. In the heartbeat handler illustrated in FIG. 16C, the heartbeat handler determines the host and an IP address for the host for which the heartbeat timer expired, in step 1642. In step 1643, the heartbeat handler determines the type of host corresponding to the heartbeat-timer expiration. The information used to make this determination is stored by the VPXA process in the VM kernel file system, in the currently described implementation. In step 1644, the heartbeat handler requests a current state/version indication for the host server corresponding to the heartbeat-timer expiration via the foreign-host adapter for the determined host type. In step 1645, the heartbeat handler waits for a response to this request. The heartbeat handler may actually wait for a response or may instead terminate, at this point, with the response handled by an additional state/version-indication-request handler. The dashed-line representation of the wait-for-response step 1645 indicates that any of many different types of techniques for waiting for, and processing, an asynchronously executed command can be used to handle the response returned by the foreign-host adapter. This same illustration convention is used in subsequent figures to indicate two or more possible approaches for handling asynchronous responses. In step 1646, the state/version indication returned by the foreign-host adapter for the host corresponding to the heartbeat-timer expiration handled by the heartbeat handler is packaged into a heartbeat response which is then sent, in step 1647, to the VI management server. In step 1648, the heartbeat timer is reset. Note that the foreign-host adapter, upon receiving the request for the state/version indication, may either immediately return a state/version indication stored for the host system based on a separate heartbeat protocol carried out between the foreign-host adapter and foreign hosts or may request information from the management interface of the foreign host, via a communications protocol, and then transform the returned information into the state/version indication returned to the VI management server in step 1647.

FIG. 16D provides a control-flow-diagram illustration of the management handler within the VPXA agent of a host-gateway appliance. In step 1650, the management handler receives a management command forwarded to the host-gateway appliance by the VI management server. In step 1652, the management handler determines the host, IP address for the host, and the type of the host to which the management command is directed, using locally stored information. In step 1653, the management handler forwards the management command and the determined information to the foreign-host adapter for the host type determined in step 1652. In step 1654, the management handler either waits for the response or terminates, with the response handled by an additional management-command-response handler. Finally, in step 1655, the management handler transmits the response received from the foreign-host adapter to the VI management server.

FIG. 16E illustrates the retrieve-changes handler executed in response to a retrieve-changes event within a VPXA-agent event loop for a VPXA agent executing within a host-gateway appliance. In step 1658, the retrieve-changes handler receives a retrieve-changes command sent to the host-gateway appliance by the VI management server. In step 1659, the host, IP address of the host, and type of host are determined. In step 1660, the retrieve-changes command, along with the information determined in step 1659, are forwarded to the foreign-host adapter corresponding to the determined host type. In step 1661, the host sync handler either waits for the foreign-host adapter to obtain configuration differences and initiate a return message stream or terminates, with an additional retrieve-changes-response handler invoked when the return message stream is initiated. In step 1662, the retrieve-changes handler coordinates return of the messages in the message stream to the VI management server.

Methods and Systems to which the Current Document is Directed

The host-gateway appliance may have uses in addition to connection of foreign hosts to VI management servers. For example, a host-gateway appliance can be used in order to provide access, by a VI management server, to multiple native host systems via a single IP address associated with a host-gateway appliance. Alternatively, the host-gateway appliance can be used so that VDC management-server commands are transmitted to native hosts connected to the host-gateway appliance via an IP address different from the IP addresses by which the native host systems are directly connected to for other purposes. In these cases, a native-host adapter, equivalent to the foreign-host adapters discussed above with reference to FIG. 16A, is included in the host-gateway appliance to allow the VPXA agent within the host-gateway appliance to communicate with VPXA agents within native hosts connected by the host-gateway appliance to the VI management server.

Figure 17A:
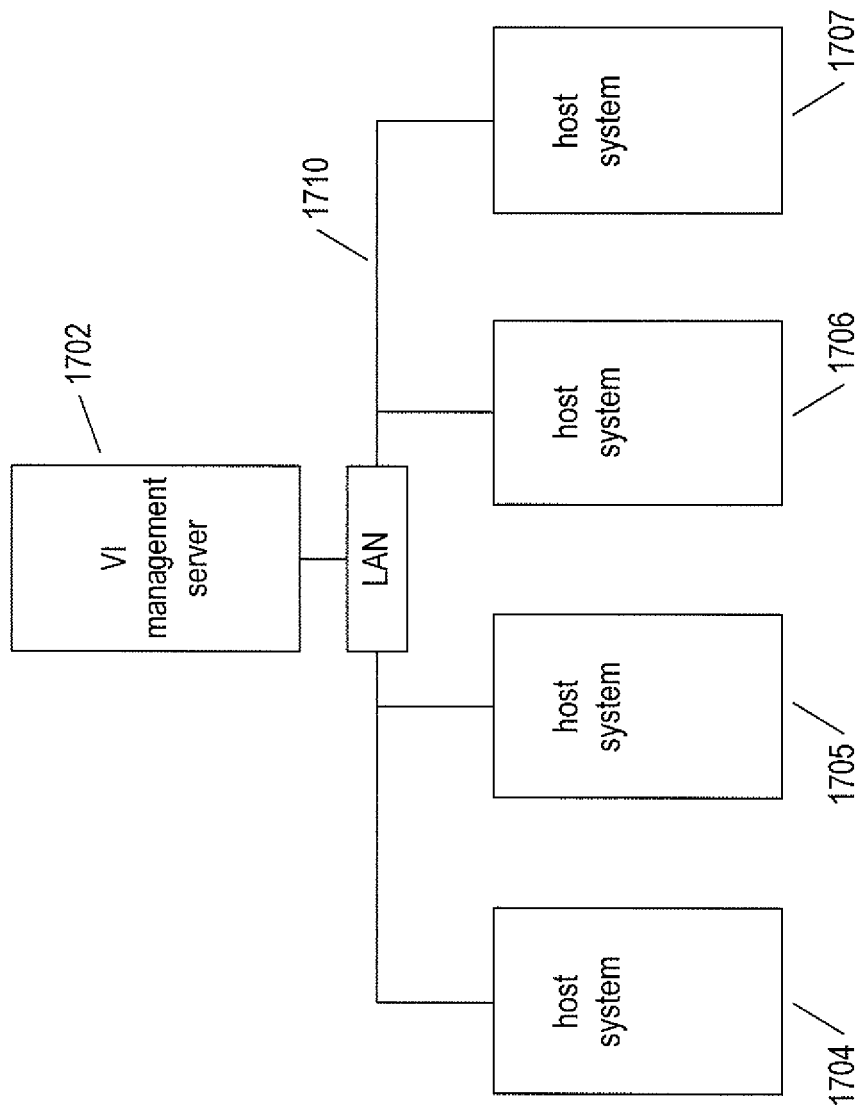
FIG. 17A illustrates the normal communications environment in which a VI management server manages a number of host systems.

FIG. 17A illustrates the normal communications environment in which a VI management server manages a number of host systems. As shown in FIG. 17A, the VI management server 1702 is interconnected with a number of host systems 1704-1707 via a local area network ("LAN") 1710. The local area network is generally an Ethernet local area network designed to interconnect computer systems within a generally small geographical area, such as a building or group of contiguous buildings using Ethernet cables, switches, bridges, hubs, and repeaters. LANs generally have relatively high data-transfer rates, in the realm of one gigabit per second, relatively low error rates, and are typically easy to maintain and cost-efficient. Because of the high data transfer rates and cost efficiency of LANs, the communications protocols developed for communication of management commands and configuration between management servers and managed host systems was not developed in light of tight communications constraints. For example, the above-described host sync operation often results in transfer of very large amounts of configuration data between host systems and management servers for even relatively modest changes to the configuration of the host. Furthermore, the protocols often involve relatively large numbers of messages in a given period of time. In many cases, management-server/host-system communication involves text-based messages rather than more-efficient types of information encoding. However, because the communications between management servers and host systems managed by the management servers has been developed for LAN communications, the relatively inefficient protocols do not present significant bottlenecks or problems for distributed-computer-system operation.

Figure 17B:
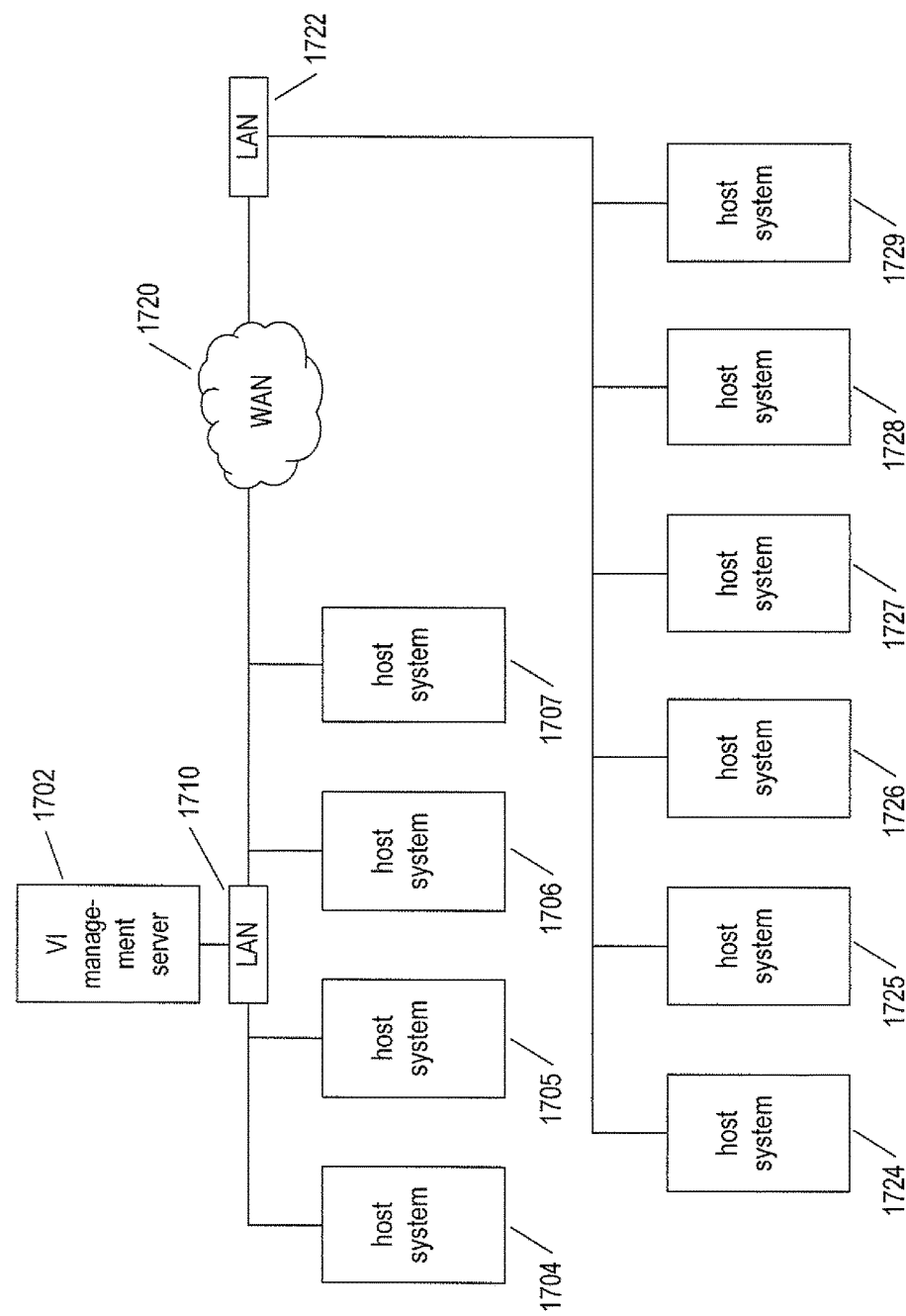
FIG. 17B illustrates extension of VT-management-server-to-host communications over larger, more geographically dispersed cloud-computing systems.

FIG. 17B illustrates extension of VT-management-server-to-host communications over larger, more geographically dispersed cloud-computing systems. As shown in FIG. 17B, with the emergence of larger, more geographically dispersed cloud-computing systems, it is a natural evolution for a management server 1702 to be connected to local host systems 1704-1707 through a LAN 1710 but to also manage geographically remote hosts system connected to the local LAN 1710 through a wide-area network 1720 that is, in turn, connected to a remote LAN 1722 to which a number of remote host systems 1724-1729 managed by the management server are connected. Wide-area networks ("WAN") are generally more complicated electronic communications systems that cover much larger geographical regions than LANs. WANs often involve both geographically dispersed LANs as well as public networks, leased lines or satellite communications, a variety of different WAN protocols, and additional, complex components including routers, multi-layer switches, and protocol/technology-specific components such as frame-relay switches and asynchronous transfer mode ("ATM") devices. WANs tend to have higher rates of transmission errors than LANs, tend to be far more expensive and difficult to maintain, and, perhaps most importantly with respect to the current disclosure, have significantly lower data-transfer rates and lower bandwidths than LANs. As a result, the exchange of request/response messages and, most particularly, configuration data between a management server 1702 and remote hosts 1724-1729 via WAN communications represents a significant performance bottleneck for the geographically dispersed distributed computing systems that involve LAN communications, such as that shown in FIG. 17B. Both the frequency of exchanged messages and the sizeable configuration-data-related messages contribute to performance bottlenecks related to the WAN communications link connecting management servers with remote host systems managed by the management servers.

Figure 18:
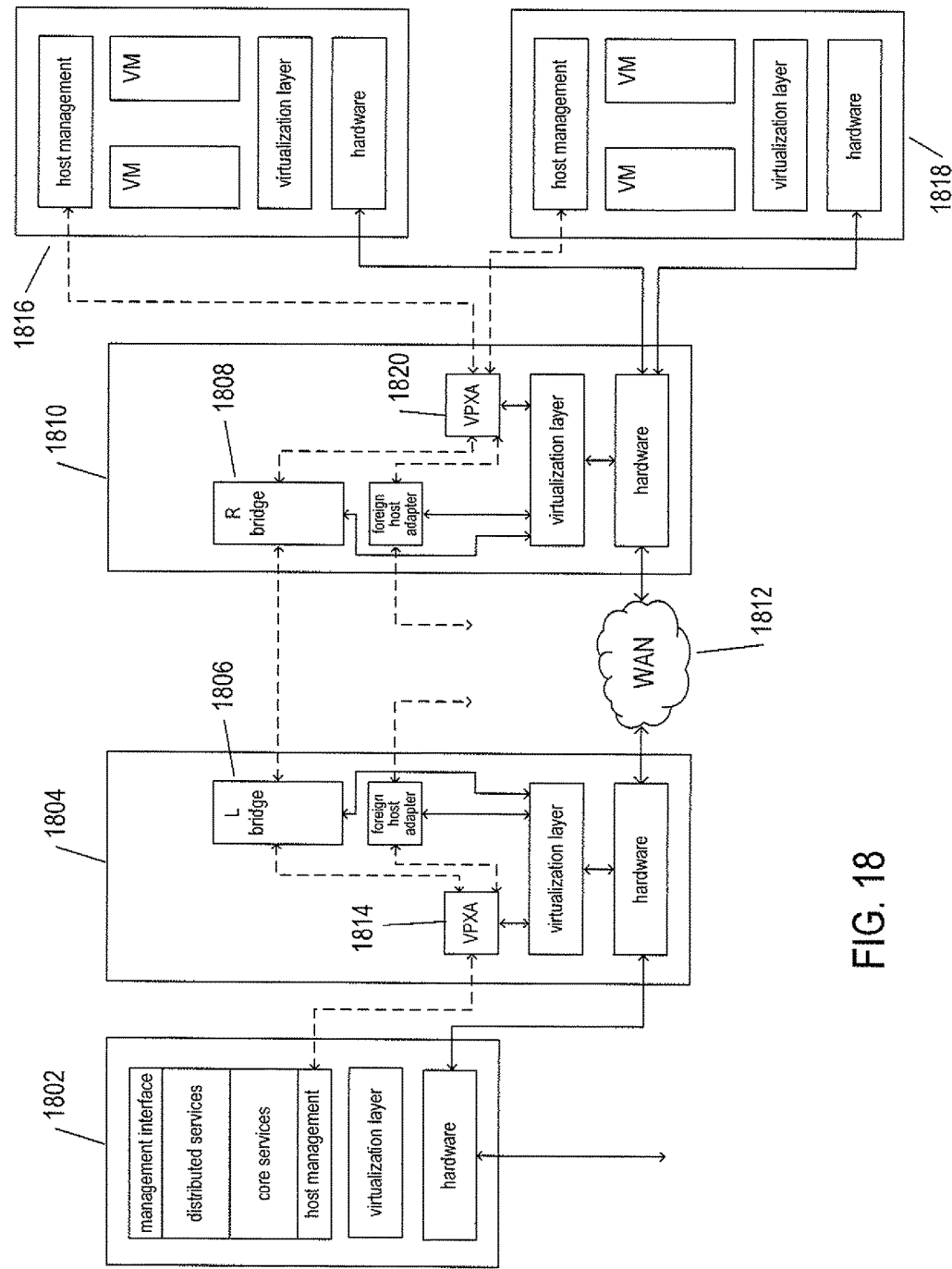
FIG. 18 illustrates one possible implementation for the proxy servers that together form the logical bridge between a local management server and remote hosts.

The current document is directed to a time-efficient and cost-effective approach to addressing the bottleneck presented by WAN communications in a widely geographically dispersed distributed computing system such as that shown in FIG. 17B. The bottleneck is addressed, according to several implementations, discussed below, by introducing local and remote proxy systems that serve as a logical bridge between a management server and a local system, and remote host systems managed by the management system that communicate with the management server, at least in part, using WAN communications. The proxy systems that constitute the logical bridge store configuration information for remote host systems managed by the management server and use an efficient, logical-bridge protocol for passing configuration information from remote host systems through WAN communications to the local management server. FIG. 18 illustrates one possible implementation for the proxy servers that together form the logical bridge between a local management server and remote hosts. As shown in FIG. 18, the management server 1802 is connected through a LAN to a modified host-gateway appliance 1804, as illustrated in, and discussed above with reference to, FIG. 16A. The modified host-gateway appliance 1804 serves as the local proxy server of the logical bridge. The modified-host-gateway appliance includes a local bridge ("L-bridge") adapter 1806 similar to the foreign-host adapters discussed above with reference to FIGS. 16A-E. However, unlike a foreign-host adapters, the L-bridge adapter logically communicates with a remote-bridge adapter 1808 in a remote host-gateway-appliance-implemented proxy server 1810 with which the local proxy server 1804 communicates, at least in part, through WAN communications 1812. It should be noted that the interface between the management server and the VPXA agent 1814 within the local proxy server 1804 is essentially a standard interface, with only slight modifications needed in the case that multiple remote hosts are managed through the local proxy server. Similarly, the remote host systems 1816 and 1818 communicate with the VPXA agent 1820 within the remote proxy server 1810 through standard interfaces. The logical bridge formed by the two proxy servers 1804 and 1810 is implemented by the L-bridge 1806 and R-bridge 1808 adapters included in the two modified-host-gateway-appliance-implemented proxy servers 1804 and 1810. In the following discussion, operation of the L-bridge and R-bridge adapters is illustrated with control-flow diagrams, similar to the flow-control diagrams used to describe operation of the foreign-host adapters in FIGS. 16C-E and used to illustrate operation of the VPXA agent in FIGS. 15A-G. The L-bridge adapter 1806 and the R-bridge adapter 1808 are illustrated as having event loops in handlers that handle events. Of course, in actual implementation, the events handled by the L-bridge adapter and R-bridge adapter may, in fact, be detected within the event loop of the VPXA agents within the proxy servers, with calls made to event handlers implemented within the L-bridge and R-bridge adapters. In other words, the L-bridge and R-bridge adapters may not have separate internal event loops. However, for ease of illustration and discussion, operation of the L-bridge and R-bridge adapters is illustrated with event loops that may correspond to logical event loop implemented within the VPXA agent or internal event loops within continuously executing L-bridge and R-bridge implementations.

Figure 19:
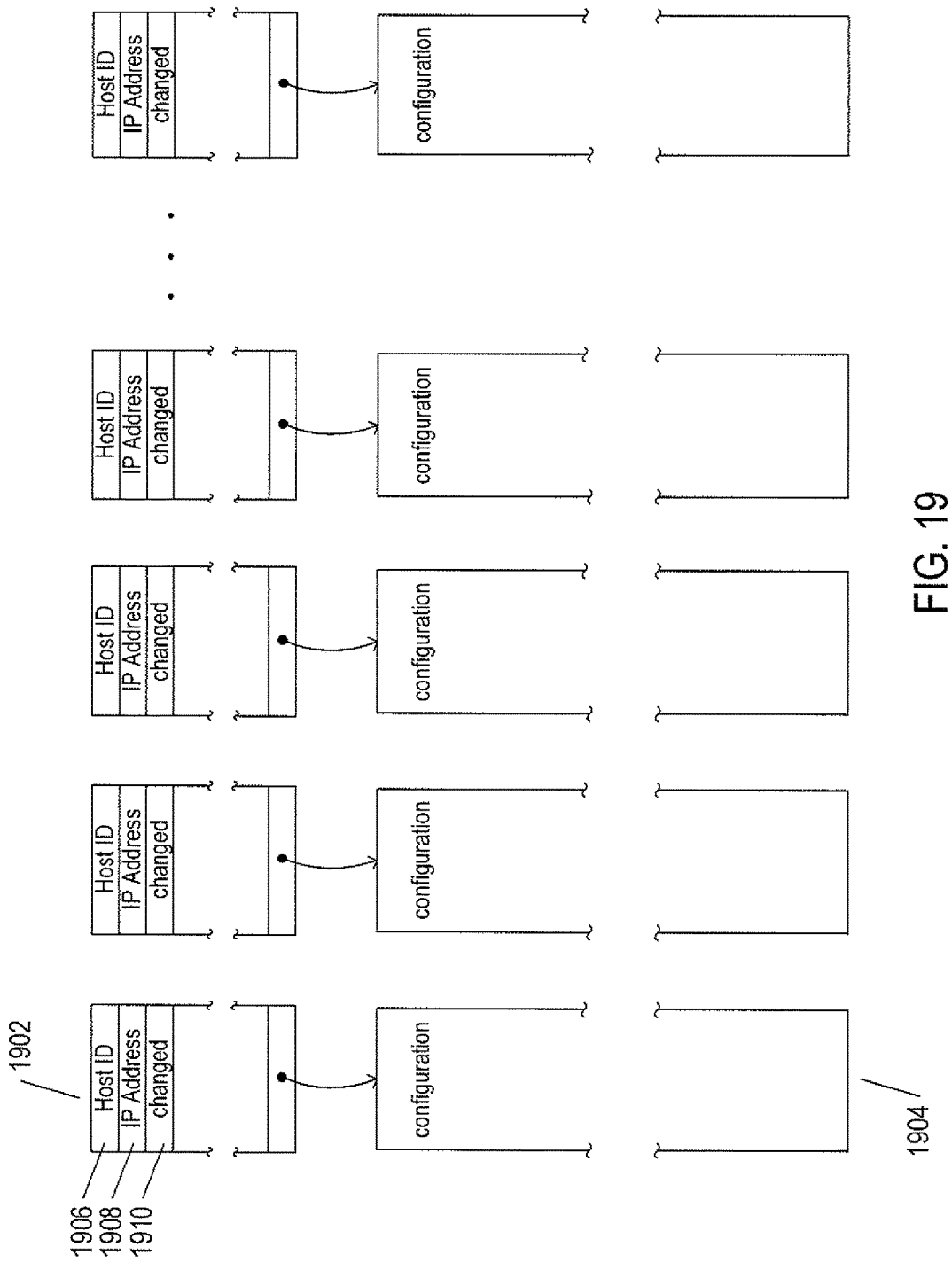
FIG. 19 illustrates the types of data stored by the L-bridge and R-bridge adapters within the proxy servers of a logical bridge to which the current application is directed.

FIG. 19 illustrates the types of data stored by the L-bridge and R-bridge adapters within the proxy servers of a logical bridge to which the current application is directed. The L-bridge and R-bridge adapters may store a host data structure, such as host data structure 1902, which references stored configuration data, such as stored configuration data 1904, for each remote host connected to a management server through the logical bridge implemented by the L-bridge and R-bridge adapters. The stored configuration information 1904 may be variously ordered and formatted according to specific implementations. Generally, the configuration information includes information about the number and locations of virtual machines within the host system, identities of the types and versions of various components within the host server, including the virtualization layer, memory, mass-storage, and networking components and capacities, and other such information. Each host data structure, such as host data structure 1902, may include an identifier for the host system 1906, one or more IP addresses through which the host system is accessed 1908, and, in the implementation discussed below, the L-bridge adapter includes host data structures with a changed field 1910. Many other types of information may be included in the host data structure, depending on the particular implementation.

Figure 20A:
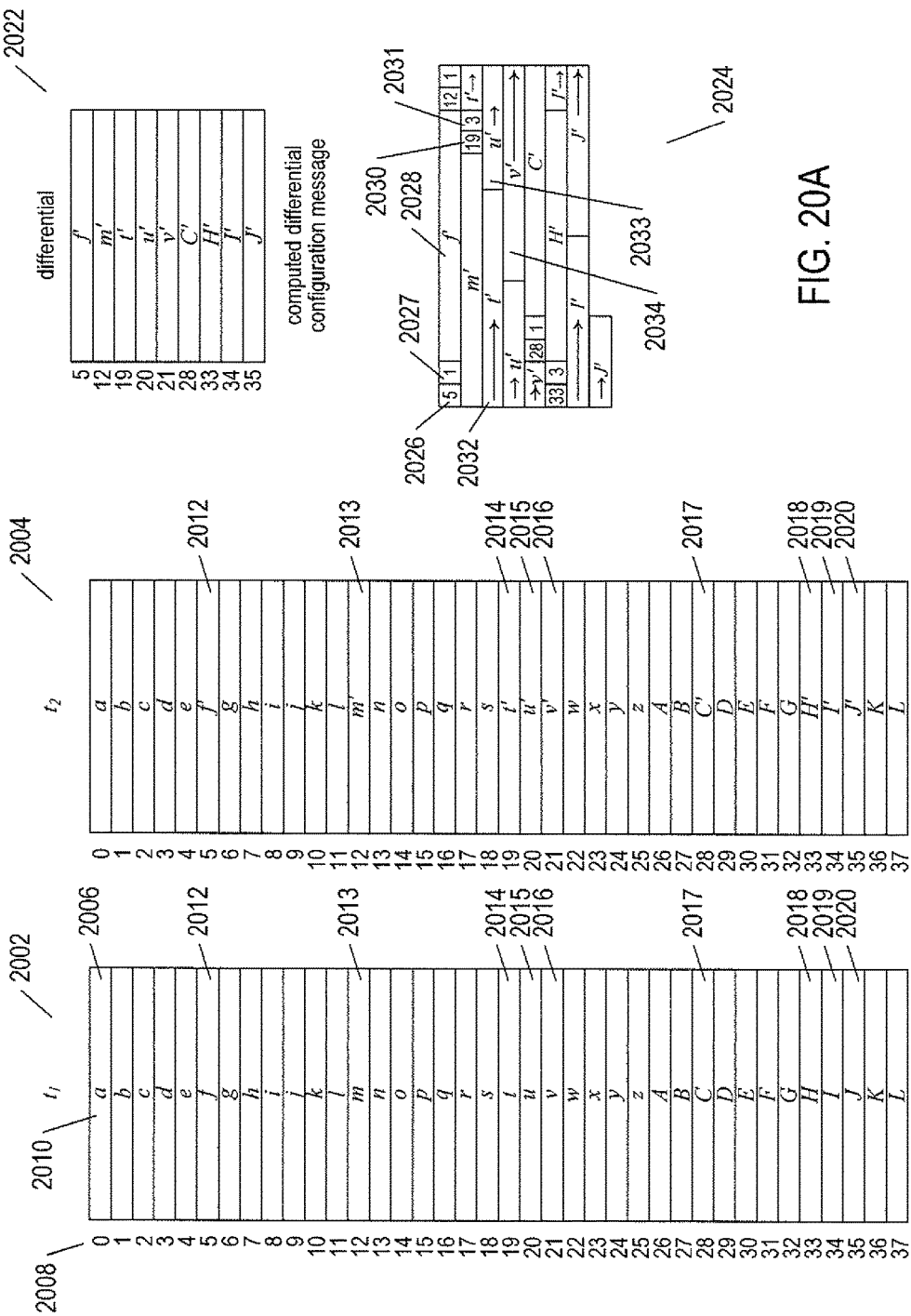
FIGS. 20A-B illustrate logical configuration data, a differential between two stored configurations, a computed-differential-configuration message, and update of a stored configuration based on a received computed-differential-configuration message.
Figure 20B:
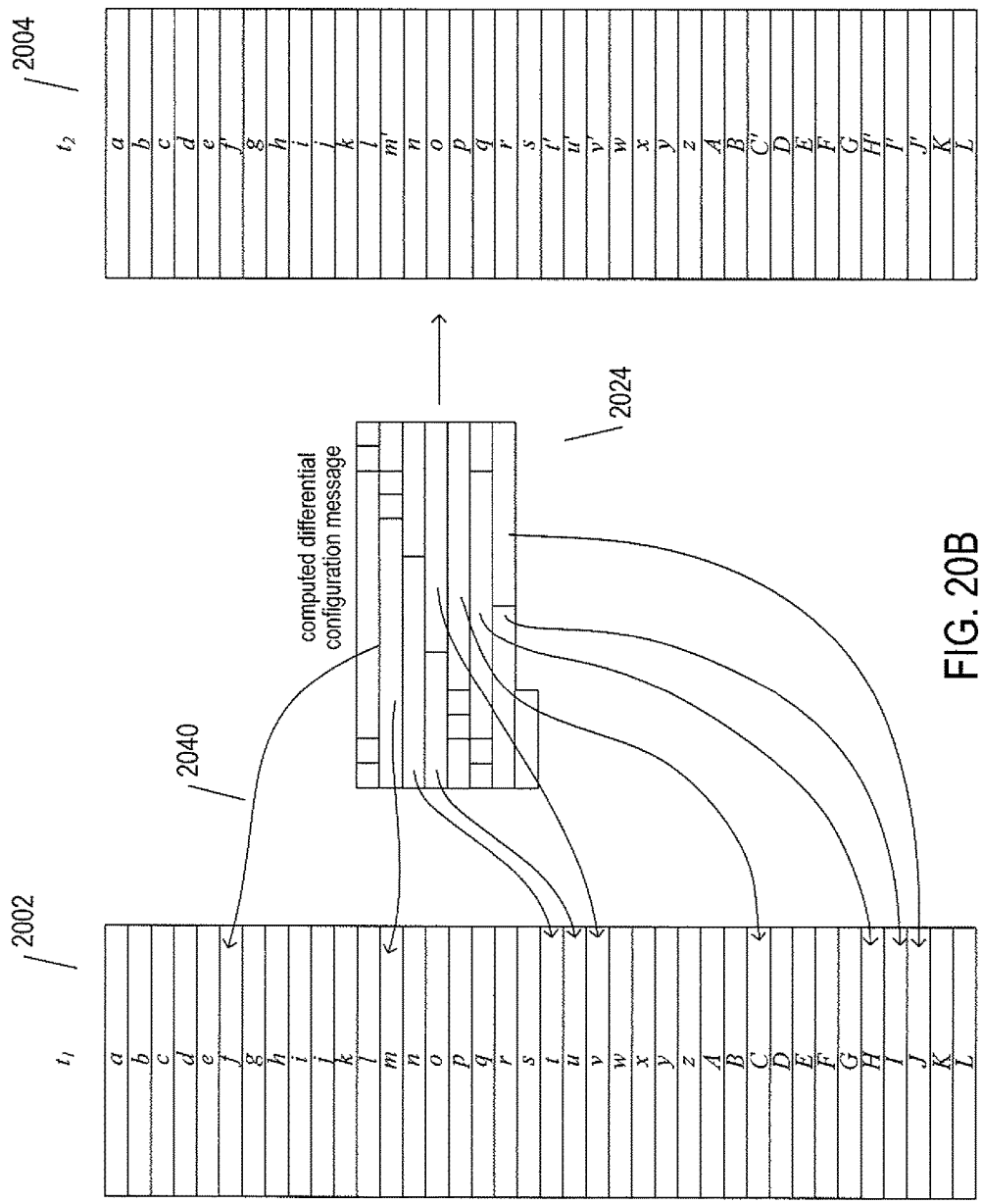

FIGS. 20A-B illustrate logical configuration data, a differential between two stored configurations, a computed-differential-configuration message, and update of a stored configuration based on a received computed-differential-configuration message. In FIG. 20A, two different versions of a stored configuration 2002 and 2004 are abstractly illustrated. The first version 2002 is the stored configuration at a first point in time, $t_1$, and the second stored configuration 2004 is the configuration at a second point in time, $t_2$. The configuration data constitutes a sequence of fields, records, or substructures, such as field 2006, each associated with a sequence number or address, such as the sequence number "0" 2008 associated with field 2006, and a stored value, such as the stored value "a" 2010 for field 2006. The fields may represent data-storage units, such as words, long words, or blocks, and the indicated value represents the contents of the memory or data-storage unit.

In general, configuration data represents host-system configuration changes over time. In the example shown in FIG. 20A, in the interval between times $t_1$ and $t_2$, the values stored in nine fields 2012-2020 have changed. The changed values are indicated by primes, such as the value f in field 2012 of the second configuration that differs from the value f in the same field of the first configuration. The differences between the two configurations, or the configuration differential, can be compactly represented 2022 by the sequence numbers or addresses of the modified fields and the modified values. In certain cases, even more compact representations can be obtained by multi-level differential indications. For example, were only a single byte within a block changed, the change could be represented by the address of the block, the address of the byte, and the changed byte. The particular methods used for differential-configuration-change representations depend on the most commonly altered storage unit and the logical structure of the configuration information. The configuration-differential representation 2022 can be encoded into a computed differential configuration message 2024 using run-length encoding. Each modified field, such as field 2012, is represented in the computed differential configuration message by a sequence number or address 2026, a length in fields 2027, and the modified values of the fields 2028. Thus, the run of three modified fields 2014-2016 is represented by the sequence number or address of the first of the three modified fields 2030, the integer 3 representing the number of fields in the ran 2031, and the three modified field values 2032, 2033, and 2034. Again, multi-level differential encoding may be used in certain cases.

In the management-server-to-host-system communications protocol, rather than using configuration-differential messages and encodings, as discussed above, all or large portions of the configuration information for a host system are transferred through the communications links between a management server and host system when the management server requests configuration updates from the host systems or receives asynchronously updated configuration information. By contrast, the proxy-server-implemented logical bridge, to which the current document is directed, employs configuration-differential representations and stored configuration information within both proxy servers to avoid repeated transfers of all or significant portions of the host-system configuration data. Both the local proxy server and the remote proxy server store configurations for each managed host and periodically update the configurations via computed-differential-configuration messages. FIG. 20B illustrates update of the stored configuration data in the local proxy server as a result of reception, by that local proxy server, of a computed-differential-configuration message from the remote proxy server. The local proxy server currently contains configuration data 2002 that represents the state of the host system at time $t_1$. Reception by the local proxy server of computed-differential-configuration message 2024 allows the local proxy server to update the values of modified fields, as represented by curved arrows, such as curved arrow 2040, to generate a local copy of the configuration data 2004 representative of the state of the host system at time $t_2$.

Figure 21A:
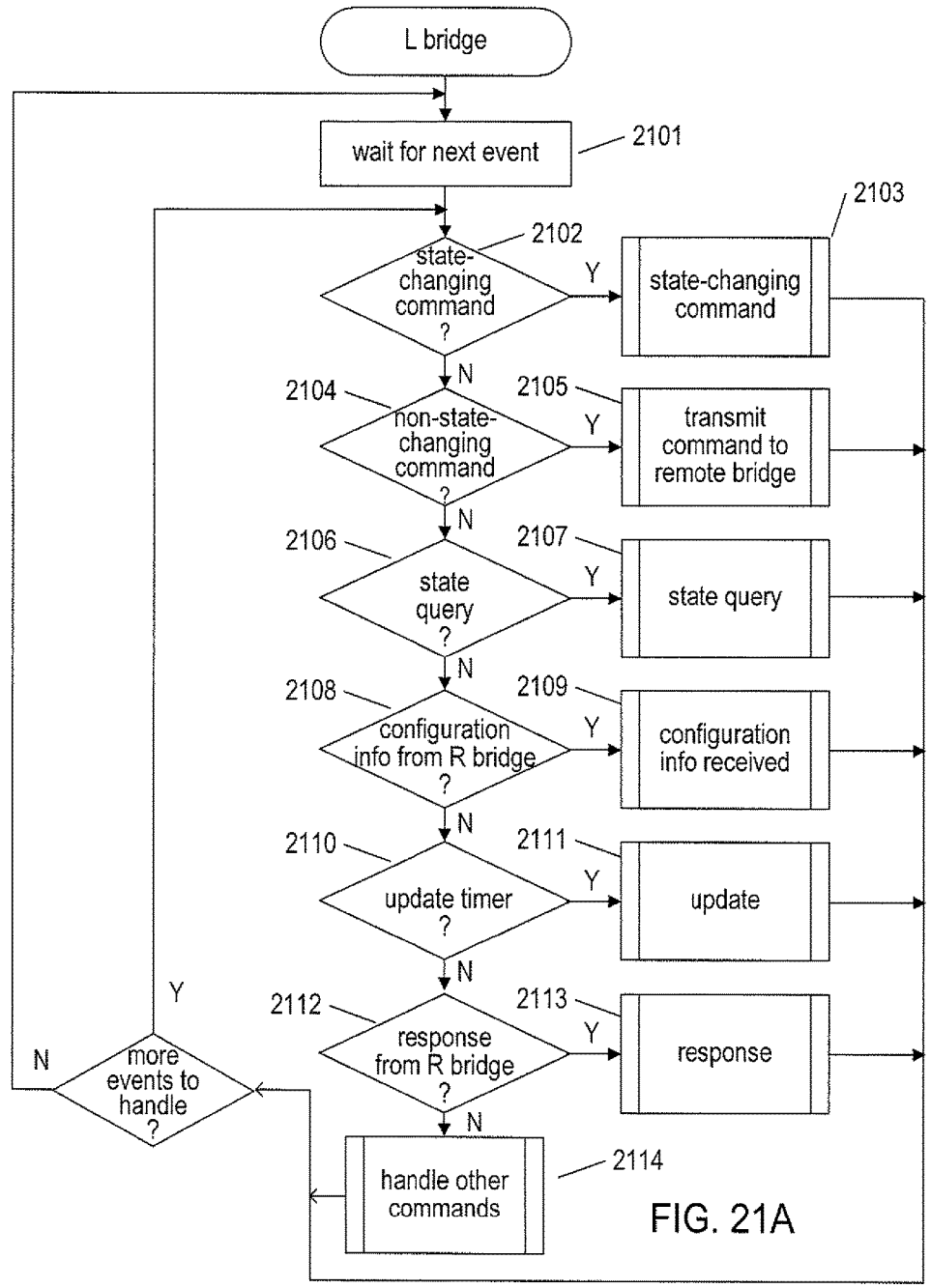
FIGS. 21A-H illustrate, using control-flow diagrams, operation of the local and remote bridge adapters within host-gateway-appliance-implemented proxy servers of a logical bridge connecting a management server with remote host systems.

FIGS. 21A-H illustrate, using control-flow diagrams, operation of the local and remote bridge adapters within host-gateway-appliance-implemented proxy servers of a logical bridge connecting a management server with remote host systems. FIG. 21A shows a control-flow diagram for a logical event loop of the local-bridge adapter. As mentioned above, events handled by the local-bridge adapter may, instead, be detected from the VPXA event loop and handled by calls to the local-bridge adapter. In step 2101, the local-bridge adapter waits for a next events. When the next event is reception of a state-changing command from the management server that is to be transmitted to a remote host, as determined in step 2102, then the routine "state-changing command" is called in step 2103. When the event is reception of a non-state-changing command from the management server for transmission to the remote host system, as determined in step 2104, then the command is transmitted to the remote bridge, in step 2105, through, at least in part, WAN communications. When the event is reception of a state or configuration query, as determined in step 2106, from the management server, then a state-query routine is called in step 2107. When the event is the reception of configuration data from the remote bridge, as determined in step 2108, then a configuration-info-received routine is called in step 2109. When the event is the expiration of an update timer associated with the remote host, as determined in step 2110, then an update routine is called in step 2111. When the event is a response message received from the remote bridge, as determined in step 2112, then a response routine is called in step 2113. A default handler 2114 handles any other types of events.

Figure 21B:
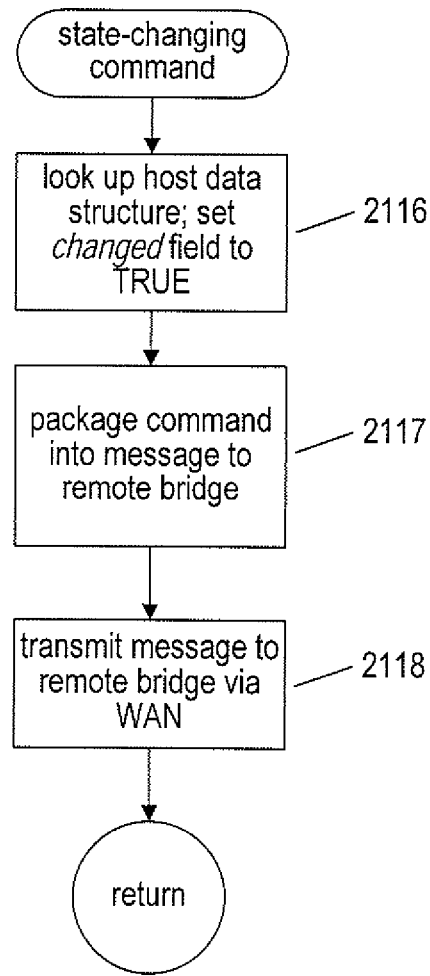

FIG. 21B shows the state-changing-command routine called in step 2103 of FIG. 21A. In step 2116, the state-changing-command routine looks up the host data structure for the host to which the state-changing command is directed by the management server. In the currently described implementation, the routine sets the changed field to the Boolean value TRUE to indicate that a command is being forwarded to the remote host system that will change the state, or configuration, of that system. In step 2117, the command received from the management server is packaged into a message for transmission to the remote bridge. In step 2118, the message is transmitted to the remote bridge via the WAN communications link. Of course, in this routine and in subsequently described routines, the steps may differ depending on different overall implementations, local communications systems, and WAN communications. For example, in certain implementations, the local-bridge adapter is called, by the VPXA agent, to transmit the command to the remote bridge, with the call including arguments specifying the target host. In yet other implementations, the VPXA agent within the local proxy server may directly forward the command to the communications subsystem for transmission to the remote host.

Figure 21C:
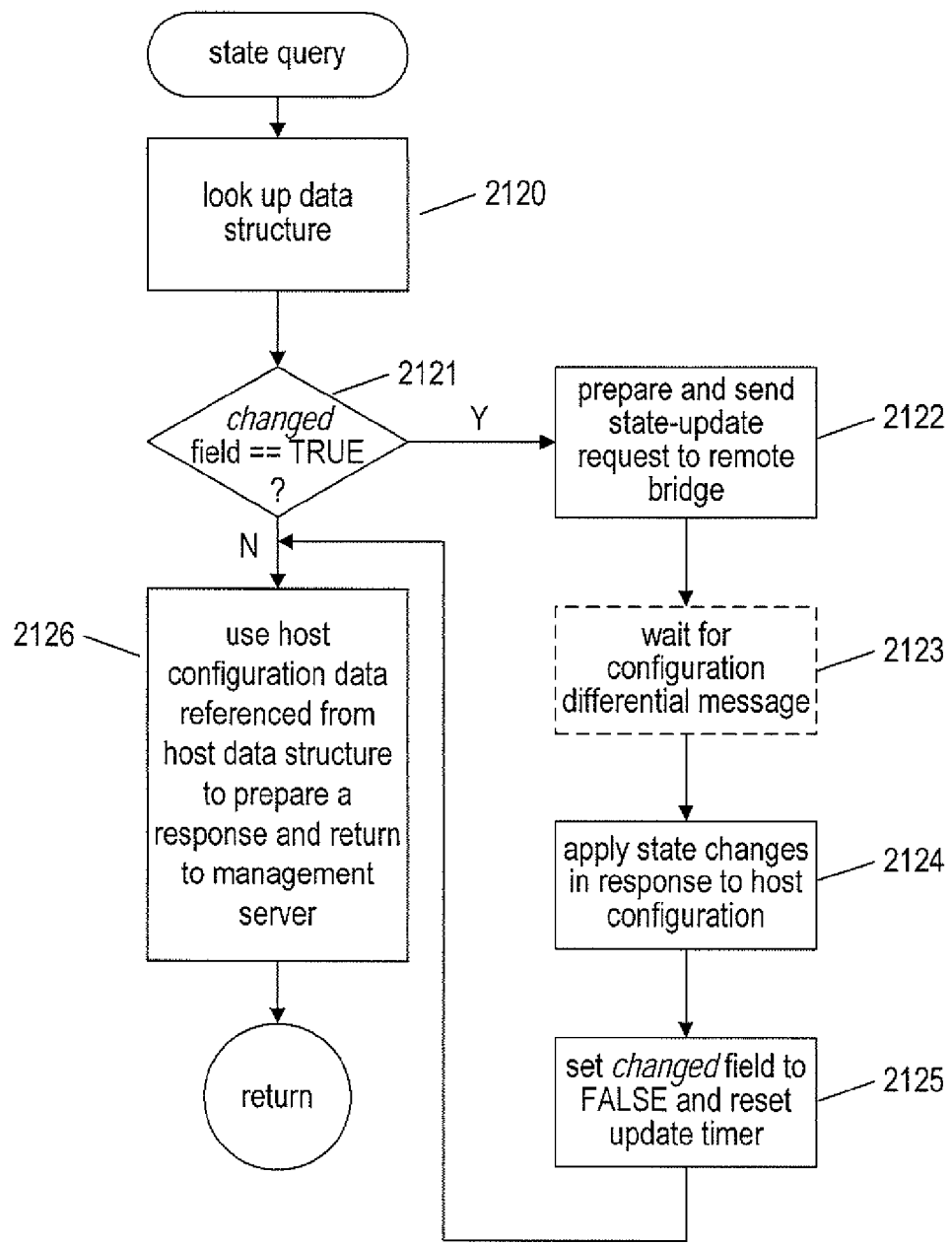

FIG. 21C provides a control-flow diagram for the state-query routine called in step 2107 in FIG. 21A. In step 2120, the state-query routine looks up the locally stored host data structure for the remote host for which the management server wishes to obtain status and/or configuration data. In step 2121, the state-query routine determines whether or not the changed field is TRUE. When the changed field is TRUE, a state-changing command has been sent to the remote host by the management server without subsequent reception of new configuration data from the remote host. Therefore, the local-bridge adapter prepares a state-update request and transmits the request to the remote bridge, in step 2122, waits for a response in step 2123, with the dashed-rectangle convention indicating that a return and a wait for an asynchronous-response-message event may be employed for this step. Once the configuration-update information is received from the remote bridge, in step 2124, the state-query routine applies the changes in the computed-differential-configuration message received from the remote bridge to the locally stored host configuration, as discussed above with reference to FIG. 20B. In step 2125, the changed field is set to FALSE and the update timer for the remote host is reset. In alternative implementations, no changed field is used by the local bridge adapter, with the assumption that the local configuration information for remote hosts is synchronized with the remote proxy server at a sufficiently high frequency that the chance of a management server requesting and receiving stale configuration information from the local proxy server is insignificant. In alternative implementations, the communications protocol used for exchange of messages and information between the proxy servers of the logical bridge may include transfer of state/version indications in request and response messages exchanged between the two proxy servers so that divergence of the configuration data for a particular remote host between the remote and local bridge adapters is immediately recognized and handled as part of the underlying protocol, so that the locally stored configuration data within the local-bridge adapter is synchronized with the remote host at a higher frequency than the frequency of request/response message exchanges between the two proxy servers. In step 2126, the state-query routine uses the host configuration data locally stored within the local proxy server to prepare a response message including the requested configuration data for return to the management server. Thus, in general, status and configuration data requested by the management server are returned by the local proxy server of the logical bridge, rather than by an exchange of request/response messages over the WAN communications link. Thus, use of the logical bridge significantly decreases the number of request/response exchanges over the WAN communications link related to fetching of configuration data by the management server from remote hosts.

Figure 21D:
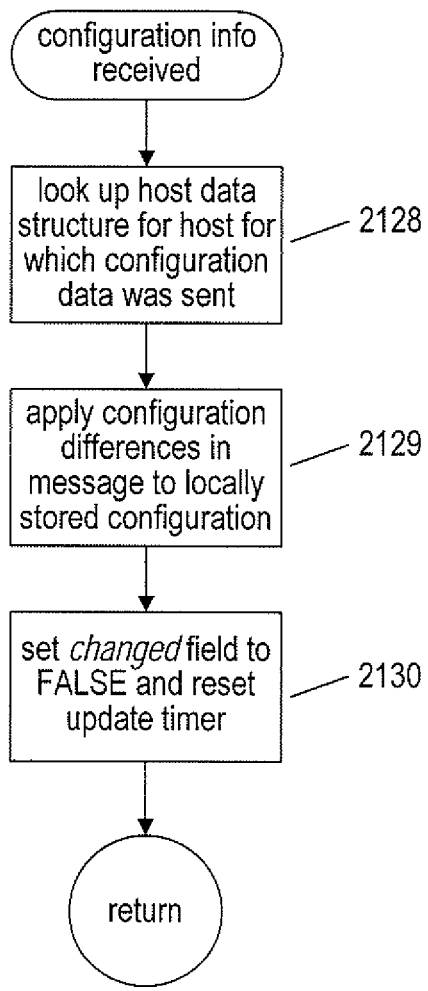

FIG. 21D provides a control-flow diagram for the "configuration-info-received" routine called in step 2109 of FIG. 21A. In step 2128, the configuration-info-received routine looks up the host data structure for the host from which configuration data has been received via the remote proxy server and remote-bridge adapter. In step 2129, the configuration-data differences in the received computer-differential-configuration message are applied to the locally stored configuration data, as discussed above with reference to FIG. 20B, in order to update the locally stored configuration data. In step 2130, the change field is set to FALSE and the update timer is reset.

Figure 21E:
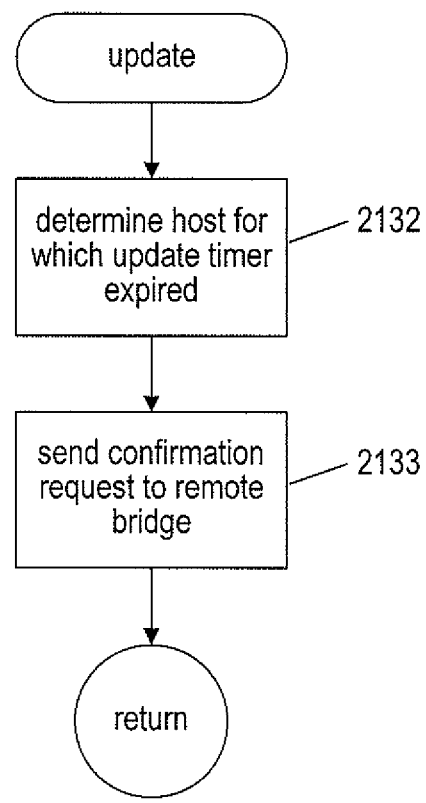

FIG. 21E provides a control-flow diagram for the update routine called in step 2011 in FIG. 21E. In step 2132, the update routine determines the host for which the update timer expired. In step 2133, the local bridge sends a configuration update request to the remote bridge.

Figure 21F:
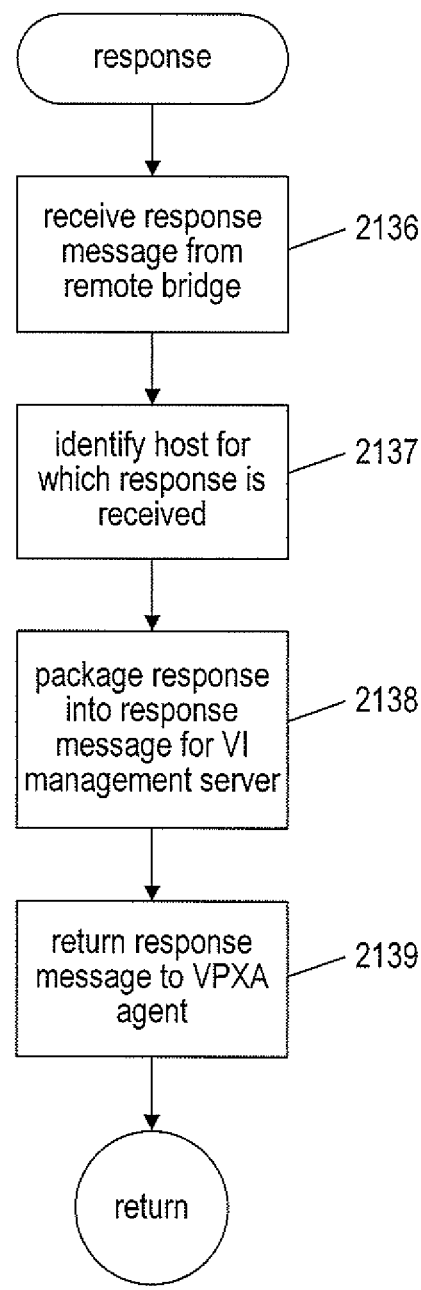

FIG. 21F provides a control-flow diagram for the response routine called in step 2113 of FIG. 21A. In step 2136, the response routine receives a response message from the remote bridge that responds to a management-server request transmitted to a remote host connected to the remote bridge. In step 2137, the response routine identifies the host for which the response message has been received and, in step 2138, packages the response message into a response message for transmission, by the VPXA communications agent, to the management server. In step 2139, the response message is passed to the VPXA communications agent.

The update timers discussed above with reference to FIGS. 21A-F provide a kind of backup polling mechanism to ensure that the local configuration stored by the local proxy server is periodically updated. In alternative implementations, the remote proxy server may manage periodic updating of configuration information using full duplex, or bidirectional, LAN communications to asynchronously send configuration-differential-configuration messages to the local-bridge adapter.

Figure 21G:
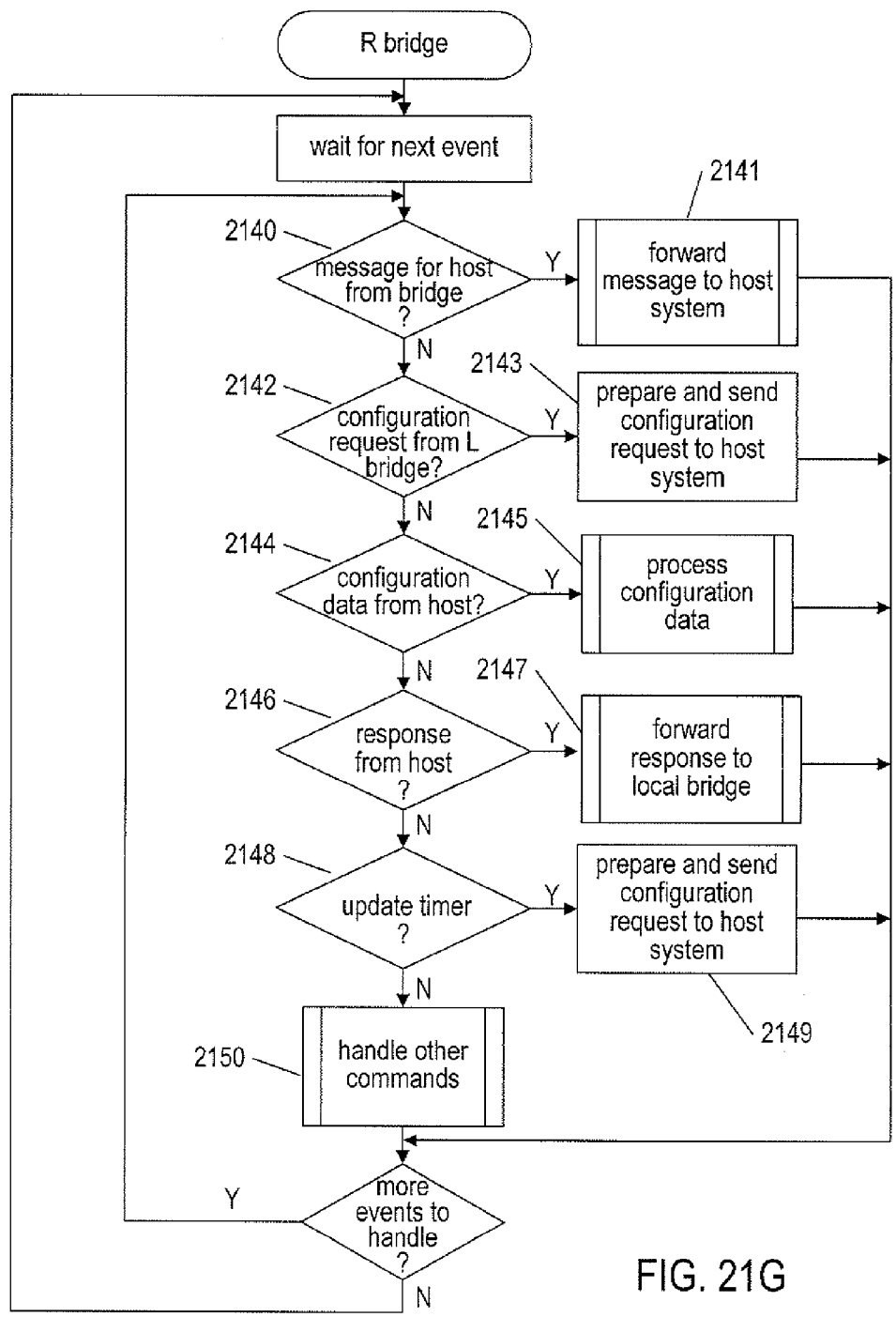

FIG. 21G provides a control-flow diagram for a logical event loop within the remote bridge adapter of the remote proxy server of a logical bridge between a management server and remote host systems. The event loop is similar to the event loop discussed above with reference to FIG. 21A. When the remote bridge receives a message from the local bridge for forwarding to a host system, as determined in step 2140, the remote bridge forwards the message to the host system, looking up the IP address for the host in the local host data structure maintained by the remote bridge, in step 2141. When the event is a configuration-data request from the local bridge, as determined in step 2142, the remote bridge prepares and sends a configuration request to the host system, using a host address obtained from the host data structure for the host, in step 2143. When the handled event is the return of configuration data from a host system to the remote bridge, as determined in step 2144, then a process-configuration-data routine is called in step 2145. When the event is reception of a response message from a remote host for forwarding to the management server, as determined in step 2146, then, in step 2147, the response message is packaged into a message that is transmitted to the local bridge, which then forwards the response message to the management server. When the event is expiration of an update timer, as determined in step 2148, then the remote bridge prepares and sends a configuration request to the host system in order to obtain configuration data in order to update the remote bridge's locally stored configuration data for the host system, and, in case the configuration has changed, transmit a computed-differential-configuration message to the local bridge, in step 2149. Other types of events are handled by a default handler in step 2150.

Figure 21H:
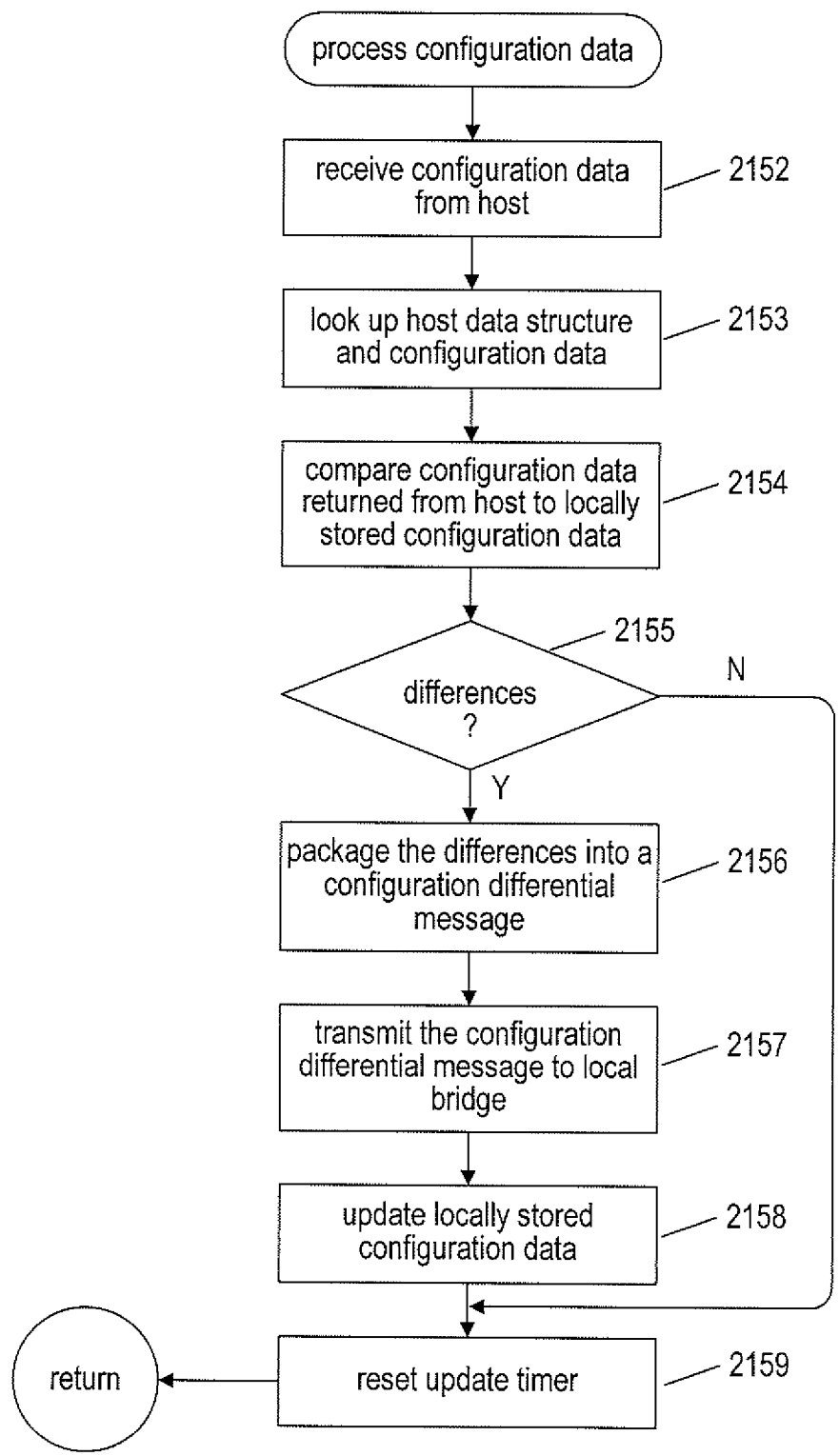

FIG. 21H provides a control-flow diagram for the "process-configuration-data" routine called in step 2145 of FIG. 21G. In step 2152, the process-configuration-data routine receives configuration data from a host system connected to the remote proxy server. In step 2153, the routine looks up the host data structure, with reference to locally stored configuration data, for the host system. In step 2154, the process-configuration-data routine compares the locally stored data with the configuration data returned by the host system. When the returned configuration data differs from the locally stored data, as determined in step 2155, the differences are packaged into a computed-differential-configuration message, in step 2156, that is sent, in step 2157, to the local bridge. In step 2158, the locally stored configuration data for the host is updated. Finally, in step 2159, the update timer for the host is reset.

FIG. 22 illustrates additional compression of communications messages provided by the logical bridge discussed above with reference to FIGS. 17-21. Not only, as described above, does the logical bridge allow for transmission of configuration-differential messages, rather than transmission of entire sets of configuration data, between the host and management server, the logical bridge also provides for compression of other types of commands and messages.

FIG. 22 illustrates compression of general management-server-to-host communications by the logical bridge. In the upper portion of FIG. 22, the logical bridge is again illustrated in similar fashion the logical bridge is illustrated in FIG. 18, using the name numerical labels. In the lower portion of FIG. 22, below horizontal dashed line 2200, the logical bridge is more simply diagrammed to illustrate general compression of information exchanged through the WAN between the management server and host server. As shown in the simplified diagram below dashed line 2200, the management server exchanges information with the L-bridge VPXA through a LAN using a native management-server-to-host protocol. The L-bridge adapter 1806 re-encodes the native-protocol message into a bridge-protocol message that is communicated from the L-bridge to the R-bridge VPXA via WAN communications 2204. The R-bridge VPXA and R-bridge adapter 1808 together recover the bridge-protocol message from the WAN communications, generate a corresponding native-protocol message, and transmit the native-protocol message through the LAN 2206 to the host server. Thus, the logical bridge is able to use a specialized bridge protocol that differs from the native protocol with which management servers normally communicate with host servers. The special bridge protocol is implemented entirely by the L-bridge and R-bridge modules 1806-1808 within the L-bridge and R-bridge proxy servers 1804 and 1810. The management server 1802 and host 1816 are unaware of the fact that the native-protocol messages which they send and receive are transmitted through the WAN in a different bridge protocol. Thus, neither the management server nor the host server need to be, in any way, modified in order to take advantage of communications-bandwidth efficiency obtained by message compression that is enabled by the bridge protocol. Of course, in the case that the logical bridge is used to connect the management server with multiple hosts, slight modifications to the management server are needed in order to demultiplex the message stream passing through a single L-bridge proxy server and direct messages to particular target hosts among the multiple hosts.

Figure 23B:
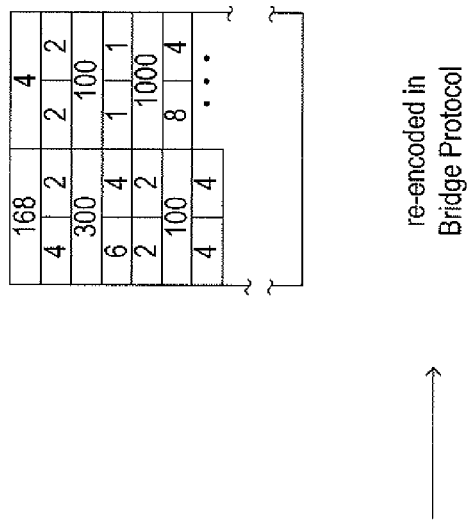

FIGS. 23A-B show a simplified example of translation of a native-protocol message to a bridge-protocol message. In FIG. 23A, a simplified, example native-protocol message 2302 is shown to include a very descriptive textual configuration overview. In normal management-server-to-host communications, as shown in FIG. 23A, the native-protocol message is packed into one or more LAN communications packets 2304 and then unpackaged by the VPXA agent of the host to produce the native-protocol message 2306 for consumption by the host server. FIG. 23B illustrates a significant amount of compression obtained by re-encoding the native-protocol message into a bridge-protocol message. In FIG. 23B, the native-protocol message 2310 is translated into a corresponding bridge-protocol message 2312. A first integer 2314 within the bridge-protocol message is a bridge-protocol message-type that indicates that the bridge-protocol message is an encoding of a native-protocol configuration-overview message 2310. Following this message-type indicator, the numeric data from the configuration-overview message is included in additional words and bytes, such as the word 2316 which includes the number "4" corresponding to the number of VMs listed in the configuration overview. The enormous compression available within the logical bridge via the bridge protocol is made possible by the fact that the L-bridge and R-bridge modules are implemented with full knowledge of the electronic communication carried out between a management server and a managed host. Even greater levels of compression may be possible for certain types of messages that contain largely the same data every time they are sent. It may also be the case that certain infrequently sent messages are not re-encoded in the bridge protocol, but simply transmitted in the native protocol, with the initial integer 2314 including a special code to indicate that the following data is native-protocol data.

Figure 24A:
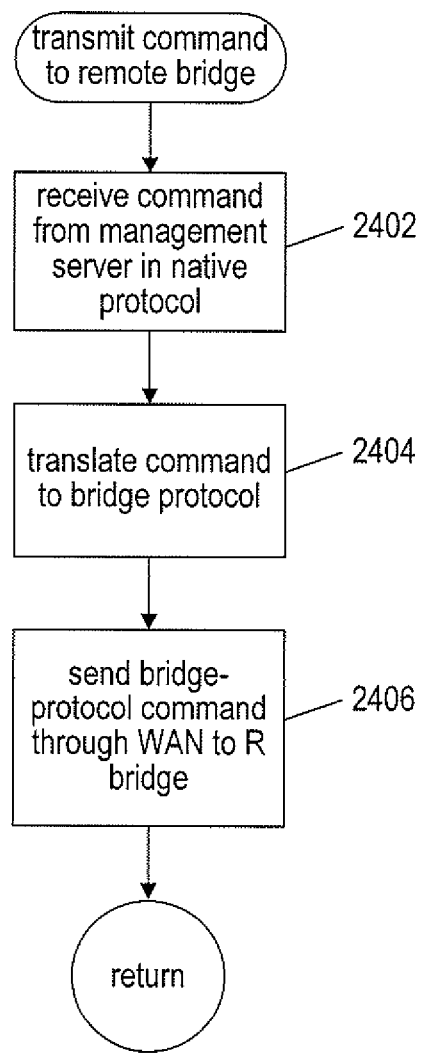
FIGS. 24A-B illustrate steps 2103 in FIGS. 21A and 2141 in FIG. 21G as an example of message transmission using the bridge protocol.
Figure 24B:
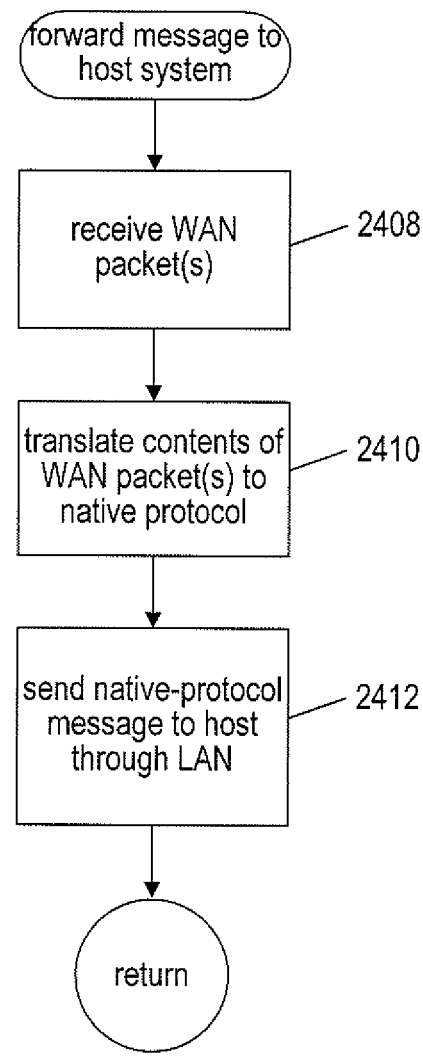

FIGS. 24A-B illustrate step 2103 in FIG. 21A and 2141 in FIG. 21G as an example of message transmission using the bridge protocol. FIG. 24A illustrates step 2105 in FIG. 21A. In step 2402, a command from the management server is received in the native-protocol encoding. In step 2404, the received command is translated into a corresponding bridge-protocol command. In step 2406, the bridge-protocol command is transmitted through the WAN to the R bridge. FIG. 24B shows the step 2141 in FIG. 21G. In step 2408, one or more WAN packets is received from the WAN communications that represent a transmitted command. In step 2410, the contents of the WAN packets are de-encoded from the bridge protocol to the native protocol. In step 2412, the native-protocol message obtained in step 2410 is packed into LAN communications packets and sent to the host.

In certain management-server-to-host communications, as one example, the Extensible-Markup-Language-like Simple Object Access Protocol ("SOAP") is used to encode and format information for exchange between management servers and managed hosts. These types of encodings and formats are quite verbose and contain a significant amount of information that is identical for every message of a particular type exchanged between a management server and the host systems. A specialized bridge protocol, developed with awareness of the types of messages and their contents exchanged between management servers and hosts, can remove a great deal of redundant information for messages of each type, as in the example of FIGS. 23A-B. Regardless of the types of communications carried out between the management server and hosts, a specialized bridge protocol can often be implemented to achieve significant compression and communications efficiency, including use of specialized compression techniques that take into account the types of messages and the invariant portions of these types of messages exchanged between management servers and hosts.

Although the present invention has been described in terms of particular embodiments, it is not intended that the invention be limited to these embodiments. Modifications within the spirit of the invention will be apparent to those skilled in the art. For example, any of many different design and development parameters may be altered to generate alternative implementations of the logical bridge, including choice of hardware, operating systems, virtualization layers, control structures, data structures, modular organization, programming language, and other such design and development parameters. As discussed above, host-gateway appliances can be modified for use as local and remote proxy servers for the logical bridge, but other hardware platforms may be used in alternative implementations. Configuration updates may be initiated by polling or by periodic, asynchronous transmission of computed-differential-configuration messages. In the above-described implementation, the computed-differential-configuration messages are host-specific but, in alternative implementations, differential-configuration data for multiple, different remote hosts may be packaged together in a single computed-differential-configuration message that is demultiplexed by the local-bridge adapter for updating the configurations of multiple remote host systems. Any of a variety of different specialized communications protocols may be employed for the exchange of information over the WAN between the local and remote proxy servers of the logical bridge. Information may be encoded textually, in binary form, or in hybrid encodings.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A logical communications bridge comprising:
   a local proxy server that includes one or more processors, one or more memories, and a communications agent that exchanges messages with a management server through a first local area network and that exchanges messages through a wide area network with a remote proxy server;
   the remote proxy server that includes one or more processors, one or more memories, a communications agent that exchanges messages with one or more remote host systems through a second local area network and that exchanges messages through a wide area network with the local proxy server; and
   bridge adapters in the local proxy server and the remote proxy server that intercommunicate using a bridge protocol that compresses message contents with respect to the native-protocol encodings of the message contents and that each locally stores configuration data for the one or more remote host systems, the remote bridge adapter in the remote proxy server periodically, for each of the one or more remote host systems
      obtaining configuration data for the remote host system,
      computing a configuration differential that encodes differences between the obtained configuration data for the remote host system and the configuration data locally stored by the remote bridge adapter for the remote host system, and
      transmitting the configuration differential to the local proxy server, the local proxy server using the configuration differential to update the configuration data locally stored by the local proxy server for the remote host system.

2. The logical communications bridge of claim 1 wherein the local proxy server receives messages directed by the management server to the one or more remote host systems and transmits the messages through the wide area network to the remote proxy server, which forwards the messages to the one or more remote host systems.

3. The logical communications bridge of claim 1 wherein the local and remote proxy servers are modified host-gateway appliances developed to connect a management server to one or more non-native host systems over a local area network.

4. The logical communications bridge of claim 1 wherein the local proxy server periodically requests a configuration differential for each remote host system.

5. The logical communications bridge of claim 1 wherein the remote proxy server periodically asynchronously transmits a configuration differential to the local proxy server for each remote host system.

6. The logical communications bridge of claim 1 wherein the local proxy server uses locally stored configuration data for a remote host system to return configuration data requested for the remote host system by the management server.

7. The logical communications bridge of claim 1 wherein the local proxy server and remote proxy server communicate with one another using one or more of:
   binary-encoded information;
   textually-encoded information.

8. The logical communications bridge of claim 1 further including, when communications messages are sent from the management server to the one or more host systems and from the one or more host systems to the management server, translating the contents of the communications messages from a native protocol to the bridge protocol by the transmitting bridge adapter and translating the contents of the communications messages from the bridge protocol to the native protocol by the receiving bridge adapter.

9. The logical communications bridge of claim 1 wherein a configuration differential for a single remote host system in packaged into a wide-area-network message by the remote proxy server for transmission to the local proxy server.

10. The logical communications bridge of claim 1 wherein configuration differentials for two or more remote host systems are packaged into a wide-area-network message by the remote proxy server for transmission to the local proxy server.

11. A distributed computing system comprising:
    one or more remote host systems;
    a management server that manages the one or more remote host systems by exchanging commands and data with the one or more remote host systems;
    a local proxy server that includes one or more processors, one or more memories, and a communications agent that exchanges messages with the management server through a first type of electronic communications; and
    a remote proxy server that includes one or more processors, one or more memories, a communications agent that exchanges messages with one or more remote host systems through a second type of electronic communications and that exchanges messages with the local proxy server through a third type of electronic communications accessed through bridge adapters in the local and remote proxy servers that employ a bridge protocol that compresses message contents with respect to the native-protocol encodings of the message contents, the remote proxy server periodically, for each of the one or more remote host systems
       obtaining configuration data for the host system,
       computing a configuration differential that encodes differences between the obtained configuration data for the host system and the configuration data locally stored by the remote bridge adapter for the remote host system, and
       transmitting the configuration differential to the local proxy server.

12. The distributed computing system of claim 11 wherein the local proxy server receives messages directed by the management server to the one or more remote host systems and transmits the messages through the third type of electronic communications to the remote proxy server, which forwards the messages to the one or more remote host systems.

13. The distributed computing system of claim 11 wherein the local proxy server receives configuration differentials from the remote proxy server and uses each received configuration differential to update locally stored configuration for a corresponding remote host system.

14. The distributed computing system of claim 13 wherein the local proxy server periodically requests a configuration differential for each remote host system.

15. The distributed computing system of claim 13 wherein the remote proxy server periodically asynchronously transmits a configuration differential to the local proxy server for each remote host system.

16. The distributed computing system of claim 13 wherein the local proxy server uses locally stored configuration data for a remote host system to return configuration data requested for the remote host system by the management server.

17. The distributed computing system of claim 11 further including, when communications messages are sent from the management server to the one or more host systems and from the one or more host systems to the management server, translating the contents of the communications messages from a native protocol to the bridge protocol by the transmitting bridge adapter and translating the contents of the communications messages from the bridge protocol to the native protocol by the receiving bridge adapter.

18. The distributed computing system of claim 11 wherein the third type of electronic communications having a lower data-transfer rate and a narrower communications bandwidth than the first and second types of electronic communications.

19. A method for interconnecting a management server with one or more remote host systems through a wide area network, the method comprising:
    connecting the management server to a local proxy server through a first local area network, the local proxy server storing a data representation of the configuration of each of the one or more remote host systems;
    connecting the one or more remote host systems through a second local area network to a remote proxy server, the local proxy server storing a data representation of the configuration of each of the one or more remote host systems;
    connecting the local and remote proxy servers by a wide area network accessed through bridge adapters in the local and remote proxy servers that employ a bridge protocol that compresses message contents with respect to the native-protocol encodings of the message contents;
    using the locally stored data representation of the configuration of each of the one or more remote host systems by the local proxy server to return configuration data for the remote host systems requested by the management server to the management server; and
    transmitting commands to, and reviving responses from, the one or more remote host systems by the management server through the first and second local area networks, the local proxy server and the remote proxy server, and the wide area network.

20. The method of claim 19 wherein the remote proxy server, for each of the one or more remote host systems, periodically:
    obtains configuration data for the remote host system,
    prepares a configuration differential that encodes differences between the obtained configuration data for the remote host system and the configuration data locally stored by the remote proxy server for the remote host system, and
    transmits the configuration differential to the local proxy server.

21. The method of claim 20 wherein the local proxy server processes each received configuration differential by using the configuration differential to update the data representation for the configuration of a corresponding remote host system stored locally within the local proxy server.

22. The method of claim 20 wherein the local proxy server periodically requests a configuration differential for each remote host computer.

23. The method of claim 19 further including, when communications messages are sent from the management server to the one or more host systems and from the one or more host systems to the management server, translating the contents of the communications messages from a native protocol to the bridge protocol by the transmitting proxy server and translating the contents of the communications messages from the bridge protocol to the native protocol by the receiving proxy server.

\* \* \* \* \*